(12) United States Patent
Joseph

(10) Patent No.: US 12,487,337 B2
(45) Date of Patent: Dec. 2, 2025

(54) LiDAR BASED MONITORING IN MATERIAL HANDLING ENVIRONMENT

(71) Applicant: Intelligrated Headquarters, LLC, Mason, OH (US)

(72) Inventor: Delbert A. Joseph, Cumming, GA (US)

(73) Assignee: Intelligrated Headquarters, LLC, Mason, OH (US)

( * ) Notice: Subject to any disclaimer, the term of this patent is extended or adjusted under 35 U.S.C. 154(b) by 2 days.

(21) Appl. No.: 18/732,342

(22) Filed: Jun. 3, 2024

(65) Prior Publication Data
US 2024/0329210 A1    Oct. 3, 2024

Related U.S. Application Data

(63) Continuation of application No. 17/065,653, filed on Oct. 8, 2020, now Pat. No. 12,038,538.

(51) Int. Cl.
*G01S 7/481* (2006.01)
*B25J 9/16* (2006.01)
(Continued)

(52) U.S. Cl.
CPC .......... *G01S 7/4817* (2013.01); *B65G 1/1371* (2013.01); *G01S 17/06* (2013.01);
(Continued)

(58) Field of Classification Search
None
See application file for complete search history.

(56) References Cited

U.S. PATENT DOCUMENTS 5,273,392 A    12/1993    Bernard et al.
6,484,886 B1   11/2002    Isaacs et al.
(Continued)

FOREIGN PATENT DOCUMENTS

CN    109154825 A    1/2019
CN    110356760 A    10/2019
(Continued)

OTHER PUBLICATIONS

Adan, Antonio, et al., "Reconstruction of As-is Semantic 3D Models of Unorganised Storehouses," Proceedings of IEEE 2019 International Conference on 3D Vision (3DV), Sep. 16 to Sep. 19, 2019, pp. 367-375, Québec City, Canada.
(Continued)

*Primary Examiner* — Eric L Bolda
(74) *Attorney, Agent, or Firm* — Alston & Bird LLP

(57) ABSTRACT

A method of monitoring an operation in a material handling environment is described. The method can include obtaining a data stream representative of a 3D-scan of a target area based on an output from a LiDAR based sensor. Further, the method can include obtaining operational specification data. The operational specification data can include, data related to a standard operating procedure (SOP) and a pre-defined heuristic. The pre-defined heuristics can be associated with an operation to be performed by at least one of: a machine and an operator, in the material handling environment. Furthermore, the method can include generating a machine learning model. The data stream and the operational specification data can be provided as inputs to train the machine learning model. Furthermore, the method can include determining, by using the machine learning model, a performance status associated an efficiency of the execution of the operation.

20 Claims, 10 Drawing Sheets

(51) Int. Cl.
  *B65G 1/137*    (2006.01)
  *G01S 17/06*    (2006.01)
  *G01S 17/89*    (2020.01)

(52) U.S. Cl.
  CPC ............... *G01S 17/89* (2013.01); *B25J 9/163* (2013.01); *B65G 2203/02* (2013.01); *B65G 2203/044* (2013.01)

(56) References Cited

U.S. PATENT DOCUMENTS

| | | | |
|---|---|---|---|
| 10,304,237 | B2 | 5/2019 | Sequeira et al. |
| 10,384,869 | B1 * | 8/2019 | Shiee .................... H04N 23/951 |
| 10,471,597 | B1 | 11/2019 | Murphy et al. |
| 12,038,538 | B2 | 7/2024 | Joseph |
| 2015/0360882 | A1 | 12/2015 | Girtman |
| 2017/0095923 | A1 | 4/2017 | Sinyavskiy et al. |
| 2018/0075643 | A1 | 3/2018 | Sequeira et al. |
| 2018/0253683 | A1 | 9/2018 | Taylor et al. |
| 2018/0345324 | A1 | 12/2018 | Hillerich, Jr. et al. |
| 2018/0370727 | A1 | 12/2018 | Hance et al. |
| 2019/0033882 | A1 | 1/2019 | Collett et al. |
| 2019/0149725 | A1 | 5/2019 | Adato et al. |
| 2020/0276713 | A1 | 9/2020 | Zhang et al. |
| 2021/0232989 | A1 | 7/2021 | Rana et al. |

FOREIGN PATENT DOCUMENTS

| | | | |
|---|---|---|---|
| CN | 210213647 | U | 3/2020 |
| CN | 111133275 | A | 5/2020 |
| CN | 111618842 | A | 9/2020 |
| EP | 3579174 | A1 | 12/2019 |

OTHER PUBLICATIONS

CN Notice of Allowance Mailed on Feb. 22, 2024 for CN Application No. 202111173397, 2 page(s).
CN Office Action Mailed on Oct. 11, 2023 for CN Application No. 202111173397, 8 page(s).
CN Office Action, including Search Report Mailed on Mar. 30, 2023 for CN Application No. 202111173397, 10 page(s).
English translation of CN Notice of Allowance dated Feb. 22, 2024 for CN Application No. 202111173397, 3 page (s).
English Translation of CN Office Action dated Oct. 11, 2023 for CN Application No. 202111173397, 13 page(s).
English Translation of CN Office Action, including Search Report dated Mar. 30, 2023 for CN Application No. 202111173397, 16 page(s).
EP Office Action Mailed on Feb. 13, 2024 for EP Application No. 21200574, 7 page(s).
Extended European search report Mailed on Feb. 28, 2022 for EP Application No. 21200574, 9 pages.
Honewell Intelligrated, "Momentum Warehouse Execution Software (WES)", Jul. 2020, [brochure, online], retreived [Jan. 4, 2021], retreived from the Internet <https://sps.honeywell.com/content/dam/honeywell-edam/sps/igs/en-us/support/resources/brochures/sps-igs-momentum-warehouse-execution-systems-brochure.pdf> (12 pages).
Honeywell Intelligrated, "Momentum Machine Control: Get the Most from Your Critical Systems", Jul. 2020, [brochure, online], retreived [Jan. 4, 2021], retreived from the Internet <https://www.intelligrated.com/sites/default/files/resources/%28MMCBBR%28EN%29-Momentum_MC_Web_4Page_LR4. pdf> (4 pages).
Non-Final Rejection Mailed on Nov. 21, 2023 for U.S. Appl. No. 17/065,653, 8 page(s).
Notice of Allowance and Fees Due (PTOL-85) Mailed on Mar. 4, 2024 for U.S. Appl. No. 17/065,653, 7 page(s).
EP Office Action Mailed on Mar. 7, 2025 for EP Application No. 21200574, 4 page(s).

\* cited by examiner

LiDAR BASED MONITORING IN MATERIAL HANDLING ENVIRONMENT

CROSS-REFERENCE TO RELATED APPLICATIONS

This patent application is a continuation of U.S. patent application Ser. No. 17/065,653, filed Oct. 8, 2020, which is incorporated herein by reference in its entirety.

TECHNOLOGICAL FIELD

Example embodiments described herein relate generally to systems, methods, and apparatuses for monitoring a material handling environment by using Light Detection and Ranging (LiDAR), and, more particularly, to use of LiDAR for monitoring operations, machines, and individuals, in the material handling environment.

BACKGROUND

Generally, in material handling sites like, but not limited to, distribution centers, warehouses, inventories, or shipping centers, various machines such as, conveyors, palletizers, robotic arms, truck loaders/unloaders, and/or conveyor overhead units are used for performing various operations. Usually, certain mechanisms are deployed for monitoring operations, machines, workers etc. in a material handling environment. For instance, a supervisor can use a central monitoring system to monitor various activities performed by the workers. In this aspect, the central monitoring system can obtain data recorded by electronic devices (e.g. personal digital assistants) that may be used by the workers. Further, in some example environments, a surveillance system having cameras and/or sensors can be deployed to record video streams of various workstations for monitoring various operations by the machines and/or activities by the workers. With that said, it is also desired to monitor efficiency related to performance of various processes, machines, and/or individuals that may be operational in the material handling environment (e.g. distribution centers, warehouses, inventories, and/or the like).

Existing mechanisms of monitoring various aspects related a material handling site has associated limitations. Further, it is also desired to monitor the processes, machines, and/or operations by individuals, within the material handling environments with a high degree of accuracy and provide actionable recommendations based on the monitoring that can result in improving overall operations and productivity of the material handling environment.

SUMMARY

Some example embodiments described herein relates to a method of monitoring an operation in a material handling environment. The method can include obtaining a data stream representative of a 3D-scan of a target area in a material handling environment. The data stream can be obtained by using an output from a LiDAR based sensor. The method can further include obtaining, from a warehouse execution system, operational specification data. The operational specification data can include a standard operating procedure (SOP) data and a pre-defined heuristic associated with an operation. In this regard, the operation can be performed by at least one of: a machine and an operator, in the material handling environment. Further, the method can include generating, a machine learning model by using the data stream and the operational specification data, as inputs to train the machine learning model. Furthermore, the method can include determining, by using the machine learning model, a performance status associated with an efficiency of the execution of the operation.

In some example embodiments the method can include scanning, by the LiDAR based sensor the target area of the material handling environment. Further, the method can include generating the data stream comprising a three-dimensional (3D) point cloud associated with at least one of: the machine, the operator, and a section of the material handling environment.

In some example embodiments, the method can further include analyzing the data stream to identify a choke point associated with the operation in the material handling environment. In this regard, the choke point can be indicative of a fault condition associated with the operator of at least one of: the machine and a workflow performed by the operator, in the material handling environment. Further, the method can include generating a message indicating at least one of: the choke point and a remedial action to be performed to resolve the choke point.

According to some example embodiments, the method can also include comparing a first set of data points derived from the data stream comprising the 3D point cloud with a second set of data points derived from the operational specification data.

In some example embodiments, the method can include determining, a new key performance indicator associated with the operation of at least one of, the machine, the operator, and a workflow process to be performed, in the material handling environment based on analysis of the operational specification data and the data stream by the machine learning model. Further, the method can include modifying the operational specification data by including the new key performance indicator in the standard operating procedure data.

According to some example embodiments, the new key performance indicator can be associated with a structural characteristic associated with at least one of: a tote, a container, a pallet, a carton, in the material handling environment. In some examples, the new key performance indicator can be associated with a route followed by the operator to pick a first item while executing an item picking workflow. In some examples, the new key performance indicator can be associated with an alignment of a tote that is conveyed through a portion of a conveyor. In some example embodiments, the new key performance indicator can be associated with an orientation of a third item while transiting through a portion of the conveyor. In some examples, the new key performance indicator can be associated with a dimension of a container entering in a zone of an automated storage and retrieval system.

According to some example embodiments, the method can further include identifying a safety issue. The safety issue can be associated with the at least one of: the machine and the operator within the material handling environment. The safety issue can be identified based on analyzing the data stream and the operational specification data by the machine learning model. Further, the method can include generating an alert indicative of the safety issue.

According to some example embodiments, the safety issue can correspond to at least one of: (a) a movement of robotic arm of a robotic manipulator in the material handling environment at an abnormal speed, (b) stacking of multiple containers by a palletizer in a manner which is prone to falling of one or more containers of the plurality of containers, in the material handling environment, (c) a path followed by an automated-guided vehicle (AGV) in the material handling environment, and (d) a motion of a conveyor belt of a conveyor in the material handling item at a speed that is prone to cause bumping of items conveyed on the conveyor belt.

According to some example embodiments, the method can include displaying at least one of: (a) a playback of the data stream, (b) a dashboard including multiple key performance indicators associated with least one of the machine and the operator, (c) a visual indicator indicating a choke point in the material handling environment, (d) an alert indicative of a safety issue associated with at least one of the machine and the operator, and (e) an audit report to visualize at least one of a production data, operations data, orchestration data associated with one or more activities performed in the material handling environment.

Some example embodiments described herein relates to a non-transitory computer readable medium that stores thereon computer-executable instructions. The computer-executable instructions in response to execution by a processor can perform operations which can include obtaining, using an output from a LiDAR based sensor, a data stream representative of a 3D-scan of a target area in a material handling environment. Further, the operations can include obtaining, from a warehouse execution system, operational specification data including a standard operating procedure (SOP) data and a pre-defined heuristic associated with an operation to be performed by at least one of: a machine and an operator, in the material handling environment. The operations can further include generating, a machine learning model by using the data stream and the operational specification data, as inputs to train the machine learning model. Furthermore, the operations can include determining, by using the machine learning model, a performance status associated with an efficiency of the execution of the operation.

According to some example embodiments, the data stream referred herein can include data corresponding to a monitoring of the operation performed by at least one of: a conveyor, a sortation system, a singulation unit, a robotic manipulator, a lift, a pallet jack, an automated guided vehicle (AGV), and the operator, in the material handling environment.

In some example embodiments, the computer-executable instructions in response to execution by the processor can perform operations including generating a first feedback indicative of a degree of deviation from a predefined efficiency level. The operations can further include generating a second feedback indicative of an action to be performed so that the execution of the action causes the execution of the operation to meet the efficiency level.

In some example embodiments, the computer-executable instructions in response to execution by the processor can perform operations that can include analyzing the data stream to identify a choke point associated with the operation in the material handling environment and generating a message indicating at least one of: the choke point and a corrective action to be performed to resolve the choke point. The choke point can be indicative of a fault condition associated with the execution of the operation. In some example embodiments, the computer-executable instructions in response to execution by the processor can perform operations that can include determining, a new key performance indicator associated with the operation of at least one of, the machine, the operator, and a workflow process to be performed, in the material handling environment. The new key performance indicator can be determined based on analyzing of the operational specification data and the data stream by the machine learning model. Further, the operations can include modifying the operational specification data by including the new key performance indicator in the standard operating procedure data.

According to some example embodiments, the computer-executable instructions in response to execution by the processor can perform operations that can include identifying a safety issue associated with the at least one of: the machine and the operator within the material handling environment. The safety issue can be identified based on analyzing the data stream and the operational specification data by the machine learning model. Further the operations can include generating an alert indicative of the safety issue.

Some example embodiments described herein relates to a material handling system. The material handling system can include a vision system having a plurality of light detection and ranging (LiDAR) based sensors. The vision system can be configured to scan a target area of a material handling environment and generate a data stream comprising a three-dimensional (3D) point cloud representative of a 3D-scan of the target area. Further, the material handling system can include a computing system that can be communicatively coupled to the vision system and a warehouse execution system. The computing system can include a processor that can be configured to obtain the data stream from the vision system. The processor can further obtain, from the warehouse execution system, operational specification data that can include standard operating procedure (SOP) data and a pre-defined heuristic. The pre-defined heuristic can be associated with an operation to be performed by at least one of: a machine and an operator, in the material handling environment. The processor can further generate a machine learning model by using the data stream and the operational specification data, as inputs to train the machine learning model. Further, the processor can determine, by using the machine learning model, a performance status associated with an efficiency of an execution of the operation.

In some example embodiments, the processor of the computing system can be configured to analyze the data stream to identify a choke point associated with the operation in the material handling environment. In this regard, the choke point can be indicative of a fault condition associated with the execution of the operation. Further, the processor can be configured to generate a message indicating at least one of: the choke point and a corrective action to be performed to resolve the choke point.

According to some example embodiments, the processor can be configured to identify a safety issue associated with the at least one of: the machine and the operator within the material handling environment. The safety issue can be identified based on analyzing the data stream and the operational specification data by the machine learning model. Further, the processor can be configured to generate an alert indicative of the safety issue.

In some example embodiments, the material handling system can further include a human machine interface including a display unit. The human machine interface can be coupled to the processor. The display unit of the human machine can be configured to display at least one of: (a) a playback of the data stream captured by the vision system, (b) a dashboard including multiple key performance indicators associated with least one of the machine and the operator, (c) a visual indicator indicating a choke point in the material handling environment, (d) an alert indicative of a safety issue associated with at least one of the machine and the operator, and (e) an audit report to visualize at least one of a production data, operations data, orchestration data associated with one or more activities performed in the material handling environment.

BRIEF DESCRIPTION OF THE DRAWINGS

The accompanying drawings illustrate embodiments of the invention, and, together with the specification, including the general description above and the detailed description which follows, serve to explain the features of the present invention.

DETAILED DESCRIPTION

Figure 1:
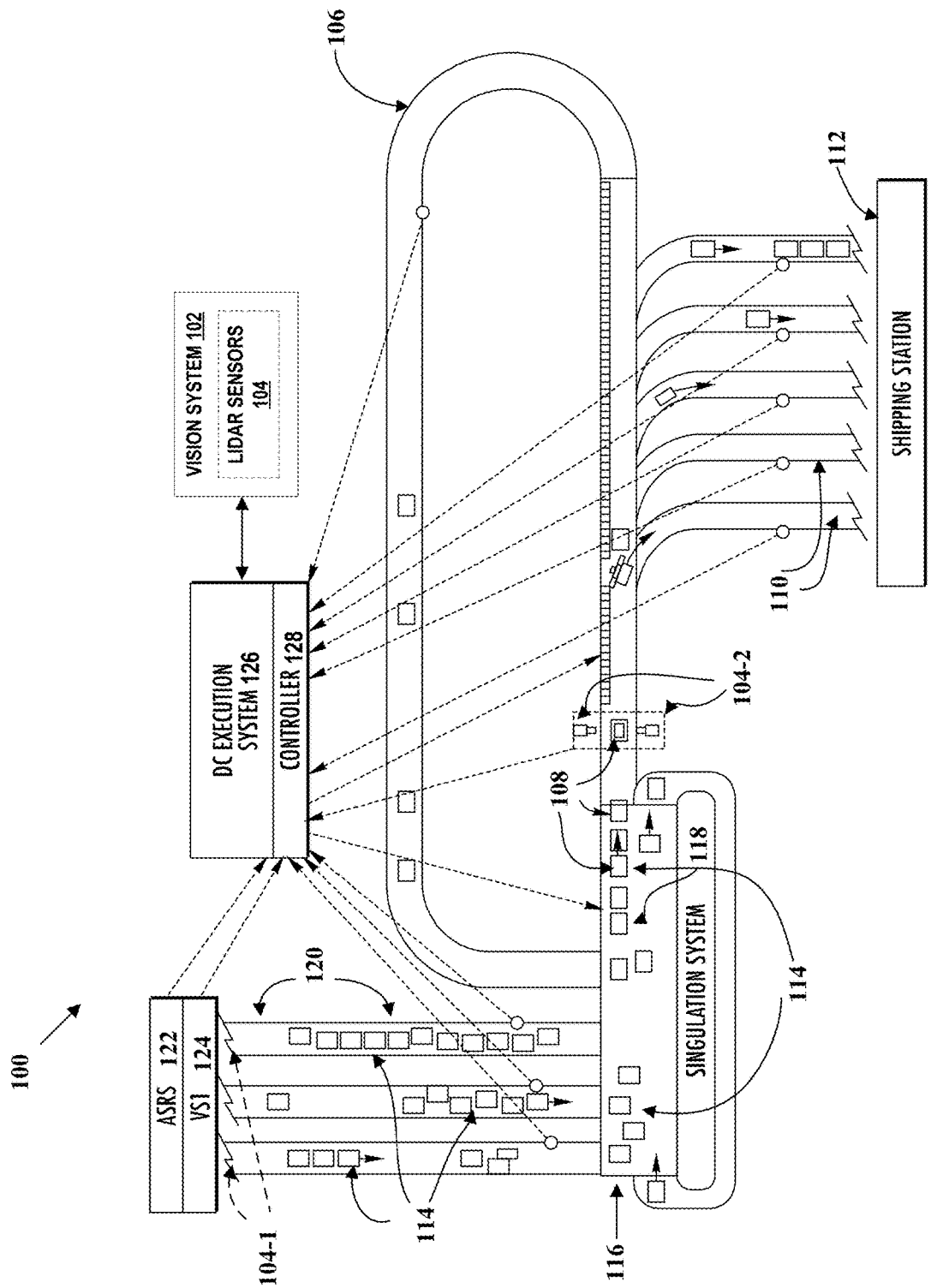
FIG. 1 illustrates a schematic view of a material handling system including LiDAR based vision system, according to an example embodiment.

The present invention now will be described more fully hereinafter with reference to the accompanying drawings in which some but not all embodiments of the inventions are shown. Indeed, these inventions can be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," "outside," "inside," etc. are used for explanatory purposes in the examples provided below to describe the relative position of certain devices or portions of devices. Terminology used in this patent is not meant to be limiting insofar as devices described herein, or portions thereof, can be attached or utilized in other orientations.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase can be included in at least one embodiment of the present invention, and can be included in more than one embodiment of the present invention (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

The terms "about" or "approximately" or the like, when used with a number, can mean that specific number, or alternatively, a range in proximity to the specific number, as understood by persons of skill in the art field.

If the specification states a component or feature "can," "can," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

As used herein, the term "transmitter" refers to any component that can generate radio waves for communication purposes while a "receiver" is used to generally refer to any component that can receive radio waves and convert the information into useable form. A "transceiver" generally refers to a component that can both generate radio waves and receive radio waves and is thus contemplated when either a transmitter or a receiver is discussed.

The term "processor" is used herein to refer to any programmable microprocessor, microcomputer or multiple processor chip or chips that can be configured by software instructions (applications) to perform a variety of functions, including the functions of the various embodiments described above. In some devices, multiple processors can be provided, such as one processor dedicated to wireless communication functions and one processor dedicated to running other applications. Software applications can be stored in the internal memory before they are accessed and loaded into the processors. The processors can include internal memory sufficient to store the application software instructions. In many devices the internal memory can be a volatile or nonvolatile memory, such as flash memory, or a mixture of both. The memory can also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device and memory within the processors themselves. For instance, memory can be any non-transitory computer readable medium having computer readable instructions (e.g., computer program instructions) stored thereof that are executable by a processor.

The term "electronic device" used hereinafter refers to any or all of, handheld devices, mobile phones, wearable devices, personal data assistants (PDAs), tablet computers, smart books, palm-top computers, barcode readers, scanners, indicia readers, imagers, Radio-frequency identification (RFID readers or interrogators), vehicle-mounted computers, wearable barcode scanners, wearable indicia readers, a point of sale (POS) terminal, headset devices, programmable logic controllers (PLCs), programmable automation controllers (PACs), industrial computers, laptop computers, desktop computers, personal computers, and similar electronic devices equipped with at least a processor configured to perform the various operations described herein.

The various embodiments are described herein using the term "computing platform" or "master device" or "server" or "supervisor device" used interchangeably for the purpose of brevity. The term "server" can be used herein to refer to any computing device or a distributed network of computing device capable of functioning as a server, such as a master exchange server, web server, mail server, document server, or any other type of server. A server can be a dedicated computing device or a computing device including a server module (e.g., running an application which can cause the computing device to operate as a server). A server module (e.g., server application) can be a full function server module, or a light or secondary server module (e.g., light or secondary server application) that is configured to provide synchronization services among the dynamic databases on computing devices. A light server or secondary server can be a slimmed-down version of server type functionality that can be implemented on a computing device, such as a smartphone, thereby enabling it to function as an Internet server (e.g., an enterprise e-mail server) only to the extent necessary to provide the functionality described herein.

In some example embodiments, the server can correspond to any of, an industrial computer, a cloud computing-based platform, an external computer, a standalone computing device, and/or the like. In some example embodiments, the master device or the computing platform can also refer to any of the electronic devices, as described herein. In some example embodiments, the server can include an access point or a gateway device that can be capable of communicating directly with one or more electronic devices and can also be capable of communicating (either directly or indirectly via a communication network such as the Internet) with a network establishment service (e.g. Internet service provider). In some example embodiments, the server can manage the deployment of one or more electronic devices throughout a physical environment. In some example embodiments, the server can refer to a network establishment service including distributed systems where multiple operations are performed by utilizing multiple computing resources deployed over a network and/or a cloud-based platform or cloud-based services, such as any of a software-based service (SaaS), infrastructure-based service (IaaS) or platform-based service (PaaS) and/or like.

In some example embodiments, the term "server" can be used herein to refer to any one of or all of programmable logic controllers (PLCs), programmable automation controllers (PACs), industrial computers, desktop computers, personal data assistants (PDAs), laptop computers, tablet computers, smart books, palm-top computers, personal computers, smartphone, headset, smartwatch, and similar electronic devices equipped with at least a processor configured to perform the various operations described herein. Devices such as smartphones, tablets, headsets, and smartwatches are generally collectively referred to as mobile devices.

The components illustrated in the figures represent components that may or may not be present in various embodiments of the invention described herein such that embodiments can include fewer or more components than those shown in the figures while not departing from the scope of the invention.

FIG. 1 illustrates a schematic view of a material handling system 100. The material handling system 100 can include at least one vision system 102 with one or more LiDAR based sensors 104, according to an example embodiment. The material handling system 100 may correspond to a material handling environment for example, but not limited to, a distribution center, a shipping station, a warehouse, an inventory, etc. According to some example embodiments, the material handling system 100 may include one or more conveyors for handling various items such as, cartons, totes, shipping packages, boxes etc. As illustrated, the material handling system 100 may include a sorter portion 106 for selectively identifying, sorting and/or diverting one or more articles 108 to one of the destinations 110, such as, but not limited to, takeaway conveyors, chutes, and the like. In some examples, the diverted articles may be sent to shipping 112 for shipping to a destination, for example, a store. While the example as shown in FIG. 1 may illustrate a paddle sorter, it is noted that the scope of the present disclosure is not limited to a paddle sorter. In some examples, the material handling system 100 may include other types of sorter(s) may be implemented, including, but not limited to, pusher/puller sorters, pop-up transfer sorters, and/or cross-belt sorters.

Although the LiDAR sensors 104 are illustrated to be located within the vision system 102, however, according to various example embodiments described herein, multiple LiDAR based sensors may be installed at various sections of the material handling system 100. In other words, the LiDAR sensors 104 may be positioned at various different sections (e.g. workstations) within the material handling system 100. Some such examples of installation of the vision systems with LiDAR sensors are also illustrated later in reference to FIGS. 2-5. Further, these LiDAR based sensors can be communicatively coupled (e.g. remotely connected) to the vision system 102, via a communication network (e.g. wireless or wired network).

Referring to FIG. 1, illustratively, a first LiDAR sensor unit 104-1 can be installed near an area corresponding to an automated storage and retrieval system (ASRS) 122. Similarly, a second LiDAR sensor unit 104-2 may be installed near another area corresponding to a singulation system along the sorter 106. In another example, similar LiDAR based sensor units may be located at the shipping station 112 or at various other positions (not shown) along the sorter 106. Accordingly, the material handling system 100 may include many more such LiDAR sensor units that may installed or mounted at various sections (e.g. dedicated zones) of a material handling environment. As stated before, these sensor units can be communicatively coupled to the vision system 102, via the communication network. These LiDAR based sensor units may be capable of capturing a data stream (e.g. 3D data stream) representative of a 3D scan of that area where the respective LiDAR sensor unit is located. The data stream can be used by the vision system 102 to monitor, one or more articles 114, machines, and/or workers present in various sections of the material handling system 100.

As illustrated, the material handling system 100 may include a sorter portion (e.g. the sorter 106) that may receive the one or more articles 114 from an induction portion 116. In some examples, the induction portion 116 may be of a singulation system 118 that can be configured to generate spacing between the one or more articles 114. For example, the induction portion 116 may comprise various mechanical components e.g. configurations of belt units and/or mechanical actuators with end effectors, which may create the spacing between the one or more articles 114. In accordance with some example embodiments, LiDAR based sensors of the LiDAR sensor unit 104-2 may capture a 3D scan of various operations and/or activities that may be performed on the singulation system 118.

In some examples, the induction portion 116 may receive articles 114 from a merge portion 120, as shown in FIG. 1. The merge portion 120 may have multiple accumulation lanes and/or conveyors for releasing articles in a slug and/or zipper fashion onto the induction portion 116. In some examples, the merge portion 120 may receive the one or more articles 114 from a receiving system and/or an automated storage and retrieval system (ASRS) 122. Additionally, or alternatively, the merge portion 106 may receive the one or more articles from other sources. In some example embodiments, the ASRS 122 may also include a separate vision system (VS1) 124 with one or more LiDAR based sensor units (similar to 104-1, 104-2) that may be installed at various locations within the ASRS 122.

According to some example embodiments, the LiDAR sensors 104 of the vision system 102 may be capable of scanning a target area of the material handling environment and generate one or more data streams. These data streams can be utilized for various purposes. In some example embodiments, a processor of the vision system 102 may utilize a data stream to construct a three-dimensional (3D) point cloud that may represent a 3D-scan of the target area. As an example, a data stream recorded by these LiDAR sensors may capture various operations of a material handling site e.g. movement of the one or more articles 114, e.g. from the induction portion 116 towards the sorter portion 106 or from the ASRS 122 to the merge portion 120, and so on. Further, data streams from various LiDAR sensors 104 may also capture operations and/or actions performed by various machines of the material handling site. For instance, in an example, the data stream may capture movement of various mechanical components e.g. conveyor belts etc. of the singulation system. Furthermore, the data streams may also capture operations performed by one or more workers in that target area.

According to some example embodiments, one or more components of the example material handling system 100, such as, but not limited to, the sorter portion 106, the induction portion 116, the merge portion 120, the vision system 102, and/or the like, may be communicably coupled to at least one of a central system e.g. a distribution center (DC) execution system 126 (or a warehouse management system) and/or a controller 128. The term "communicably coupled" refers to two or more components (for example, but not limited to, the sorter portion 106, the induction portion 116, the merge portion 120, the vision system 102, the DC execution system 126 and the controller 128 as shown in FIG. 1) being connected through wired means (for example but not limited to, wired Ethernet) and/or wireless means (for example but not limited to, Wi-Fi, Bluetooth, ZigBee), such that data and/or information may be transmitted to and/or received from these components.

In some examples, the DC execution system 126 and the controller 128 may adjust, modify, and/or control a set of system variables for the example material handling system 100. The term "system variables" refers to parameters associated with the operation of a material handling system. Example system variables may include, but not limited to, speed commands (e.g., conveyor speed, merge speed, sortation speed, etc.), recirculation commands, sortation commands (e.g., destination implementation, divert commands, etc.), shutdown commands, accumulation controls, discharge controls, induction controls, chute actuation, and sensor (e.g., photo eyes) inputs/outputs. For example, system variables associated with the sorter portion 106 may include, but not limited to, speed commands, recirculation commands, chute actuation, and/or sortation commands described above. As another example, system variables associated with the induction portion 116 may include, but not limited to, speed commands, accumulation controls, and/or induction controls described above. As another example, system variables associated with the merge portion 120 may include, but not limited to, speed commands and/or discharge controls described above.

According to some example embodiments described herein, these system variables can be adjusted, modified, and/or controlled based on analysis of the data stream captured by one or more LiDAR sensors 104 of the vision system 102. In some examples, system variables associated with the vision system 102 e.g. configuration of the LiDAR sensors 104 may also be adjusted, modified, and/or controlled by the DC execution system 126 and the controller 128.

According to some example embodiments, the controller 128 may obtain one or more data streams captured by one or more LiDAR sensors 104 of the vision system 102. Further, the controller 128 may obtain, from the DC execution system 126 operational specification data. In some examples, the operational specification data can be obtained from a warehouse execution system and/or a warehouse management system. The operational specification data can include, for example, but not limited to, standard operating procedure (SOP) data, a pre-defined heuristic that may be associated with an operation to be performed by at least one of: a machine and an operator, in the material handling environment, and/or other data that may be associated with past operations performed by the machines and/or the workers.

According to some example embodiments, the controller 128 may utilize the data stream and the operational specification data to generate a machine learning model. In this regard, the controller 128 may provide the data stream and the operational specification data, as inputs to train the machine learning model. According to said example embodiments, the controller 128 can utilize this machine learning model to determine a performance status associated with an efficiency of an execution of the operation, further details of which are described in reference to FIGS. 2-10 hereinafter.

Figure 2:
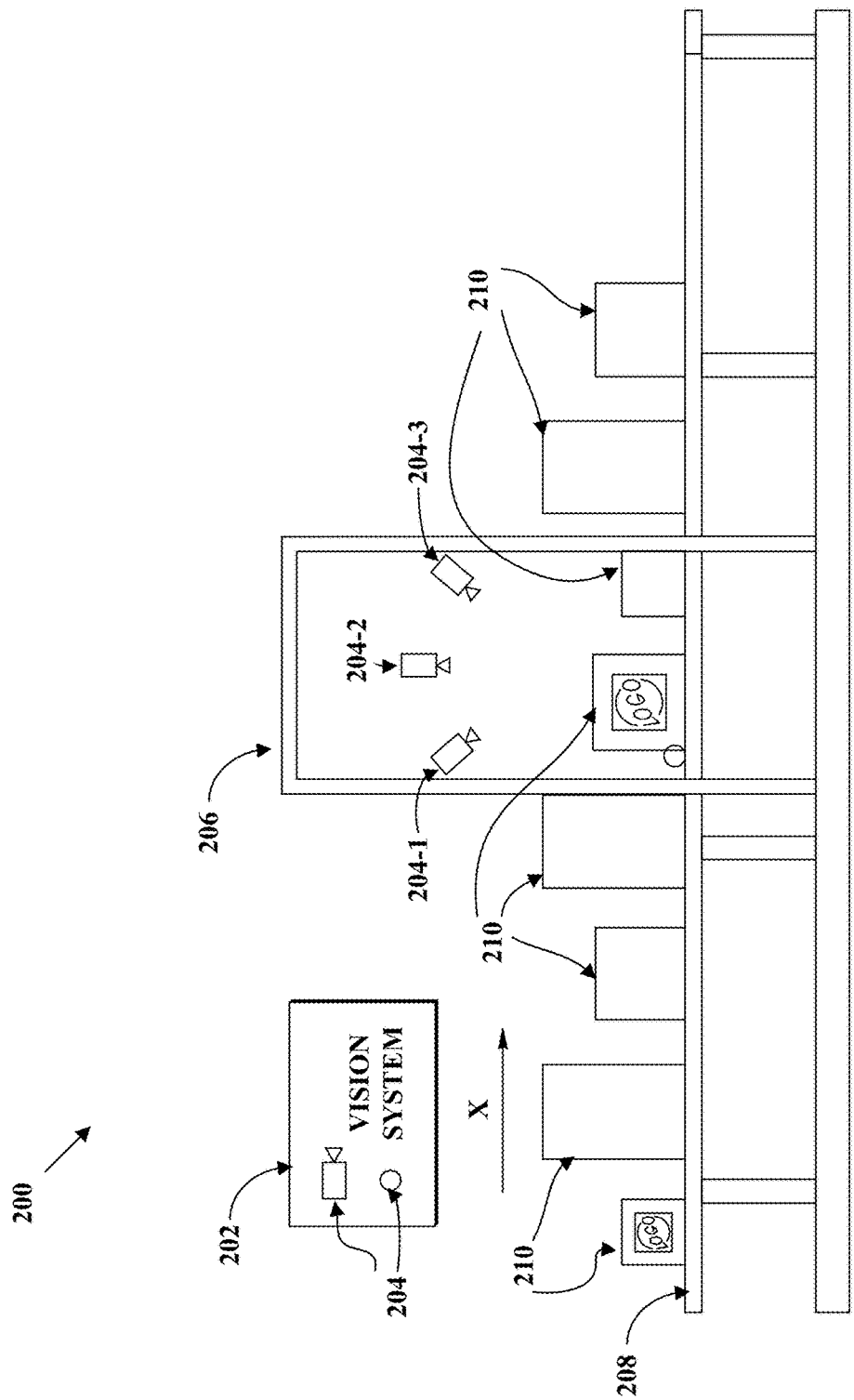
FIG. 2 illustrates a schematic view of a vision system including LiDAR sensors for monitoring a target area in a material handling environment, in accordance with an example embodiment.

FIG. 2 illustrates a schematic view 200 of a vision system 202 including one or more LiDAR sensors 204 for monitoring a target area 206 in a material handling environment, in accordance with an example embodiment. As stated earlier in reference to FIG. 1, in some example embodiments, the one or more LiDAR sensors 204 may be located at various locations within the material handling environment. For instance, as illustrated in FIG. 2, one or more LIDAR sensors (204-1, 204-2, 204-3) may be located in a section of the material handling environment including a conveyor 208. Illustratively, in an example, the one or more LiDAR sensors (204-1, 204-2, 204-3) may be configured to capture a 3D scan of the target area 206. As may be understood, each of the one or more LiDAR sensors (204-1, 204-2, 204-3) may be capable of illuminating the target area 206 with laser light and measure a reflection of the reflected laser light with the sensor component of the respective LiDAR sensor 204. Further, the 3D scan may be representative of three-dimensional representation of the target area 206 and may include, the conveyor 208, one or more items 210 that may be on the conveyor 208. Further, in some examples, the 3D scan may also capture one or more machines (e.g. conveyor belts) and/or operations performed by these machines. Furthermore, in some examples, the 3D scan may also include one or more workers and/or activities performed by the one or more workers. In the example, as shown in FIG. 2, the one or more items 210 may be placed on a conveyor belt of the conveyor 208 and may be conveyed in a conveyance direction X towards the target area 206.

According to some example embodiments, the one or more LiDAR sensors 204 may be capable of capturing a 3D representation of each of these items 210 from different angles and/or directions. For example, the LiDAR sensors 204 may be capable of performing a 3D scan that captures one to six sides of the one or more items 210. Further, this 3D scan be used to by a processor of the vision system 202 to construct a 3D point cloud that may represent an entire view of the target area 206 including objects, machines, workers etc. that may be present in the target area 206 at a time of scanning by the LiDAR sensors (204-1, 204-2, 204-3).

As an example, a data stream from the one or more LiDAR sensors 204 can capture three-dimensional information corresponding to: a conveyor system (e.g. the conveyor 208), a sortation system (e.g. the sorter portion 106), a singulation unit (e.g. the singulation system 118), a robotic manipulator, a lift, a pallet jack, an automated guided vehicle (AGV), etc. that may be used for various operation in the material handling environment.

In some example embodiments, the LiDAR sensors 204 may be positioned on a machine operative in the material handling environment. For instance, in some examples, one or more LiDAR sensors 204 may be positioned on a robotic item handler (e.g. a Robotic carton unloader) or an automated guided vehicle (AGV). In such cases, the LiDAR sensors 204 may be configured to perform a forward scanning of an area to command and control various operations of the respective machines. While the example as shown in FIG. 2 illustrates three LiDAR sensors (204-1, 204-2, 204-3), it is noted that the scope of the present disclosure is not limited to three sensors. As described earlier in reference to FIG. 1, in accordance with some example embodiments, there may be multiple LiDAR sensors that may be located at various locations/sections of a material handling environment. Accordingly, it is to be appreciated that, less than three sensors, more than three sensors, and/or additional or alternative sensor units are possible within the scope of the present disclosure.

In some examples, sensing by the LiDAR sensors 204 of the vision system 202 may be triggered in response to detecting an event. Alternatively, and/or additionally, sensing by the LiDAR sensors 204 can be performed continuously or periodically at pre-defined time periods. In an example, the LiDAR sensors (204-1, 204-2, 204-3) may perform a 3D scan of the target area 206, in response to detecting an item (i.e. from amongst the items 210) entering a scan zone of the LiDAR sensors 204. For example, in an embodiment, a sensor (e.g. LiDAR sensor 204-1) may be placed at an entry of the scan zone. Thus, when the item passes through the LiDAR sensor 204-1, the sensor may detect the presence of the item and may initialize scanning operation of the remaining LiDAR sensors (204-2, 204-3).

According to some example embodiments, the data stream captured by the LiDAR sensors 204 may be utilized for various purposes. As an example, the data stream captured by the LiDAR sensors 204 can be utilized by the vision system 202 and/or the controller 128 to recognize dimensions of the one or more items 210. In some examples, the data stream can also be utilized to identify one or more defects in the items 210 (e.g. product is being damaged by the system at jam points, failing belts or rollers, etc.). Further, in some example embodiments, the data stream may also be utilized by the vision system 202 to identify visible characteristics associated with the items 210 and drive operational decisions based on visible item characteristics. For instance, the controller 128 may command various actions based on identification of such visible item characteristics e.g., but not limited to, defect rate, dimensions, orientation of items 210, manner of placement of items 210 on the conveyor 208 etc. As an example, the controller 128 may analyze the data stream to identify a choke point associated with an operation in the material handling environment. The choke point can be indicative of a fault condition associated with the operation of a mechanical component (e.g. a robotic manipulator), a machine (e.g. a conveyor section), and/or a workflow performed by the operator, in the material handling environment. For example, the controller 128 based on the data stream may identify that a dimension of one or more items 210 that may not be suited to perform an ASRS operation by the ASRS 122. In another example, the controller 128 based on the data stream may identify one or more items to be arranged in an orientation which may not be suitable for handling by an end effector of a robotic manipulator. More of such examples are described later in description. According to the said example embodiment, upon identification of such choke point, the controller 128 may also generate a message indicating at least one of: the choke point and a remedial action to be performed to resolve the choke point.

In accordance with various example embodiments described herein, the vision system 202 including the one or more LiDAR sensors 204 may be communicably coupled to a central controller, e.g. the controller 128 as described in FIG. 1. In accordance with some example embodiments described herein, the controller 128 may obtain the data stream including 3D information of a target area captured by the LiDAR sensors 204. Further, the controller 128 may build a machine learning model by utilizing the data stream along with other information such as, operational specification data including standard operating procedures (SOP) and one or more pre-defined heuristics associated with various operations, utilization of machines, etc. within the material handling environment. The machine learning model can determine a performance status associated with performance of execution of an activity by a worker and/or an operation by the machine within the material handling environment. In other words, the machine learning model can determine if workers, machines, etc. are operating as per standard operating procedures or not. In case of any deviation, the controller 128 can be capable of performing various corrective actions, details of which are further described in reference to FIGS. 3-10.

Figure 3:
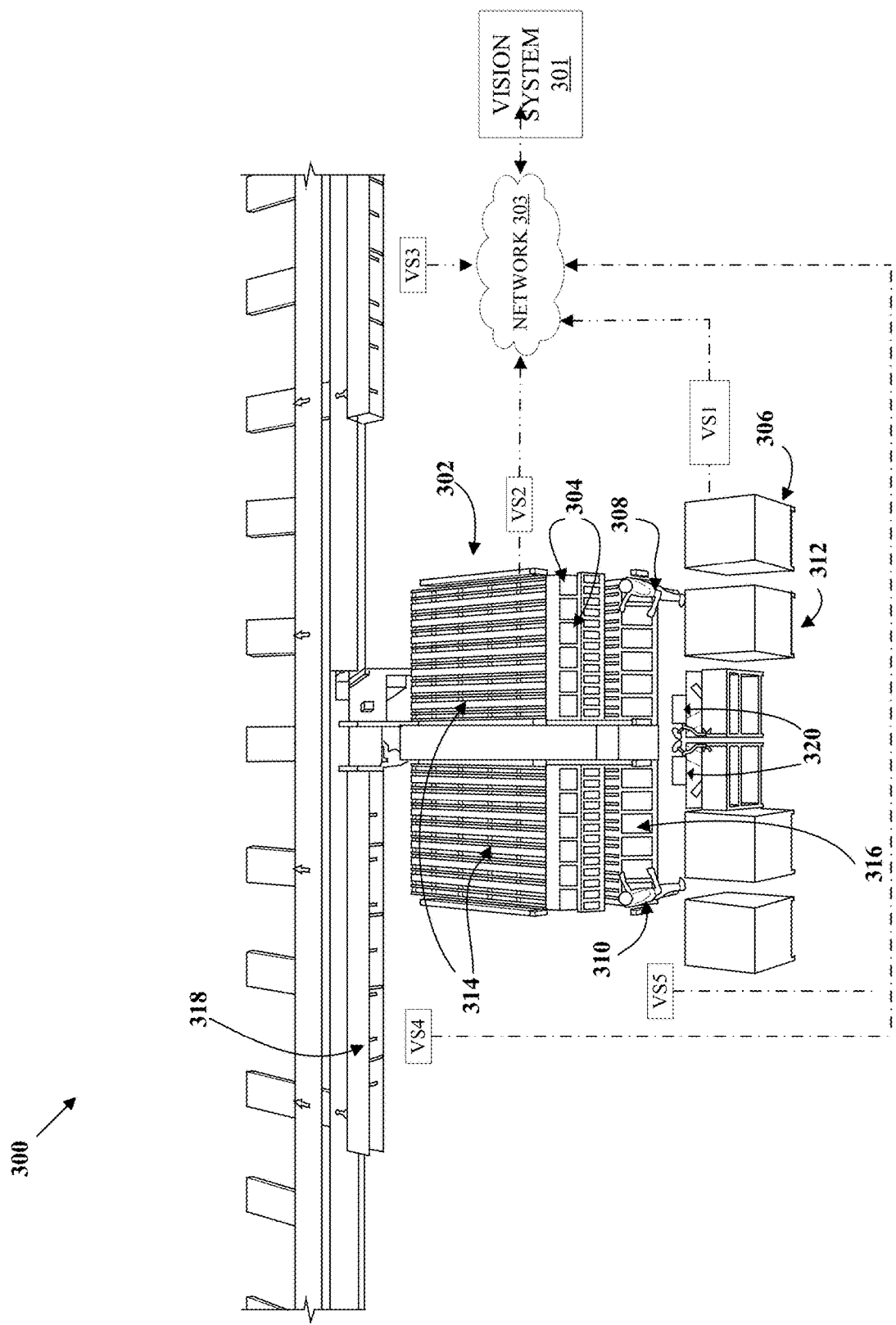
FIG. 3 illustrates a schematic view of a target area of the material handling system including the LiDAR based vision system, according to an example embodiment.

FIG. 3 illustrates a schematic view 300 of a target area of the material handling system 100 including the LiDAR based vision system, according to an example embodiment. The target area may correspond to an area of a distribution center (DC). As can be understood, the DC may receive goods in bulk from various manufacturers, suppliers, stores, shipping stations, and the like, and may store and/or handle received goods until the goods are further picked and/or shipped. Further, the received goods may be transferred into totes and/or containers of appropriate size, shape, material, etc. for storage and/or further processing. In accordance with some example embodiments described herein, the DC may include a vision system 301 that may be communicatively coupled, via a network 303, to multiple LiDAR based sensor units VS1, VS2, VS3, VS4, etc., as illustrated in FIG. 3. Similar to as described earlier in reference to FIGS. 1-2, these LiDAR based sensor units (VS1-VSn) may be capable of recording data streams including 3D scan of a target area. The network 303 may correspond to a wired or wireless communication network.

Illustratively, in some example embodiments, the DC may have a replenishment area 302 for replenishing one or more containers 304 with goods arriving at the replenishment area 302 in multiple stock keeping units (SKUs) 306. The term 'replenishment area' as used herein may refer to an area, system, workstation, and the like in the DC for transferring goods from the multiple SKUs 306 into one or more containers 304. The replenishment area 302 may have a collaborative system of multiple material handling devices and systems, such as, but not limited to, infeed conveyors, outfeed conveyors, goods to operator workstations, devices, staging units, and the like. Transferring goods from an SKU into the containers 304 may be automated, for example, may be done by a robotic tool, and/or may be a manual process carried out by an operator, such as operators 308 and 310, as shown in FIG. 3. In accordance with some example embodiments described herein, one or more LiDAR based sensors may be associated with the replenishment area 302 to perform a 3D scan that can capture activities, operations, devices, and/or workers in the replenishment area 302. Accordingly, there can be multiple vision systems that may be associated with different sections of the DC. These vision systems can make use of LiDAR based sensors to record the activities related to operators, items, and/or machines within the respective section. As an example, as illustrated in FIG. 3, a vision system unit VS2 with one or more LiDAR sensors 204 can be associated with the replenishment area 302.

According to said example embodiments, an SKU 306 may include goods of a similar type, size, shape, and/or any other common characteristic. In an embodiment, one or more SKUs 306 may be grouped together and stacked on a pallet 312, as shown in FIG. 3. The SKUs 306 may be grouped based on a common characteristic, such as type of goods. Additionally, or alternatively, mixed SKUs 306 may be grouped randomly and placed on the pallet 312. The SKUs 306 may be grouped and stacked on the pallet 312 at the DC for ease of handling. In some embodiments, each SKU 306 and each pallet 312 may include a respective identifier (e.g. a barcode label, RFID tag) that can be scanned at the replenishment area 302. The scanned information may indicate a location of the pallet 312 at the replenishment area 302. In some example embodiments, one or more LiDAR based sensor units may also be located in the DC to perform 3D scan of an area including the SKUs 306 and/or pallets 312. Illustratively, in an example, two vision system units VS1 and VS4 with LiDAR sensors 204 may be located to track activities, operations, and/or characteristics associated with the SKUs 306 and/or the pallets 312.

In accordance with some example embodiments, the replenishment area 302 can include a gravity flow rack 314 for staging and/or conveying one or more containers 304. Further, the replenishment area 302 may include multiple replenishment zones. The gravity flow rack 314 may be placed between different replenishment zones, such that the gravity flow rack 314 may convey replenished containers from a first replenishment zone 316 to a second replenishment zone 318 and convey empty containers back from the second replenishment zone 318 to the first replenishment zone 316. The gravity flow rack 314 may also function as a staging area for the empty and/or filled containers 304 until the containers 304 are handled by the operator 308 and/or a robotic tool. In accordance with some example embodiments, the vision system unit VS2 may scan the area including the gravity flow rack 314.

The replenishment area 302 may further include one or more devices 320. The devices 320 may refer to any portable and/or fixed device (e.g. a human machine interface HMI) that may be communicably coupled to a central controller (e.g. the controller 128). In some examples, the devices 320 may include an input/output interface which may be used for assisting the operator 308 in the replenishment process. According to some examples, the devices 320 can correspond to or include for example, but not limited to, scanners, imagers, displays, computers, communication devices, headsets, and the like. According to some example embodiments, the devices 320 may further receive data, commands, workflows, etc. from the central controller and/or any other device that may be communicably coupled to the devices 320. According to some example embodiments, the vision system units VS1 and VS5 using the LiDAR based sensors may perform a 3D scan of area including the one or more devices 320.

According to some example embodiments, the data stream captured by the vision system 301 may monitor various activities, operations, individuals, and/or equipments in the DC. For instance, the data stream may be used to monitor arrival of the pallets 312 having one or more SKUs 306 at the replenishment area 302 of the DC. Further, the data stream may monitor scanning of a pallet identifier and/or an SKU identifier using the devices 320 by any of the operators 308 and/or 310. In some example embodiments, the data stream captured by the LiDAR sensors 204 of the vision system 301 may also include an operation by a robotic tool (not shown) and/or the operators (308, 310) to pick one or more of the containers 304 on the gravity flow rack 314 for replenishing the one or more containers 304 with the goods that may be in the SKU 306 and/or the pallet 312. Further, in some example embodiments, the data stream captured by the LiDAR sensors 204 of the vision system units VS2, VS3, and/or VS4 may include conveyance or movement of the one or more containers 304 that may be on the gravity flow rack 314. In this aspect, the containers 304 may be conveyed from the first replenishment zone 316 to the second replenishment zone 318 through the gravity flow rack 314. In some example embodiments, the data stream may also include monitoring of empty container(s) that may be placed on the gravity flow rack 314 for transferring back to the first replenishment zone 316 for receiving goods from a next SKU and/or pallet. In an example embodiment, the data stream can also include movement of some containers to one or more shuttle totes that can be moved for storing goods in an Automated Storage and Retrieval System (ASRS) in the DC.

In some embodiments of the present invention, the data stream captured by various vision system units VS1-VS5 may be used to construct a machine learning model. Further, in accordance with some example embodiments, the machine learning model can determine a performance status associated with performance of execution of an activity by a worker and/or an operation by the machine within the DC.

In other words, the machine learning model can determine if workers, machines, etc. are operating as per standard operating procedures or not. In case of any deviation, a controller (e.g. the controller 128) can be capable of performing various corrective actions. As an example, based on the data stream corresponding to the 3D scan of various areas of the DC, the controller can determine a best pallet to choose for replenishment. In another example, the controller based on the monitoring of the DC by the data stream, the controller may define a priority order indicating priorities for replenishing the pallets 312. Thus, the data stream and the machine learning model based on the data stream can be utilized by the controller to take various actions that may improvise operational execution, productivity, and/or safety within the DC. More examples of the actions performed based on the output of the machine learning model are described in reference to FIGS. 4-10.

Figure 4:
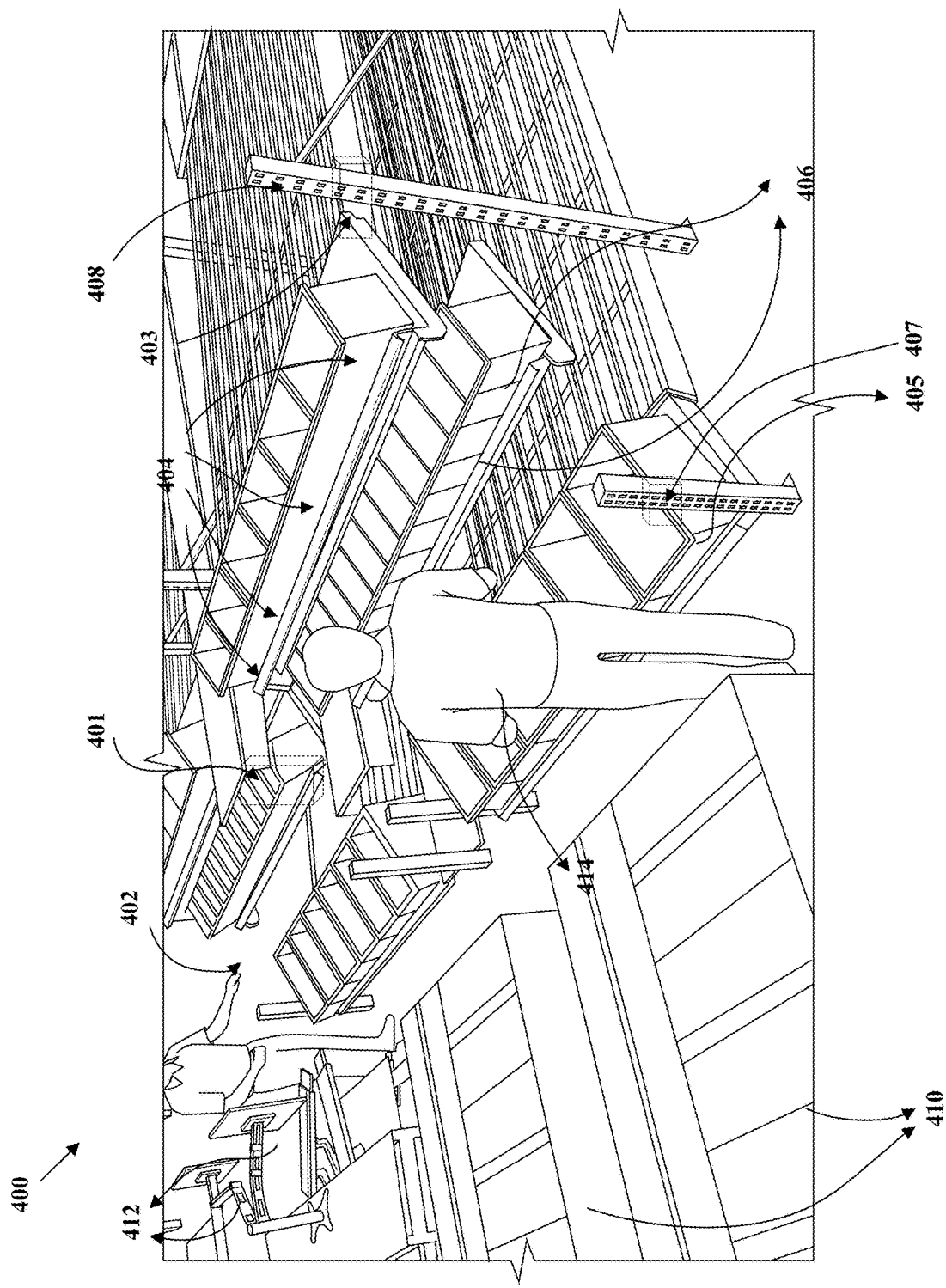
FIG. 4 illustrates an example scenario depicting monitoring of an operation performed by a worker in a material handling environment by using LiDAR based vision system, according to an example embodiment.

FIG. 4 illustrates an example scenario 400 depicting monitoring of an operation performed by a worker in a material handling environment by using LiDAR based vision system (e.g. the vision system 102, 202), according to an example embodiment. In some example embodiments, the operation may be performed in a replenishment zone of a distribution center. FIG. 4 illustrates an example of a replenishment zone 402 of a distribution center (e.g. the DC as illustrated in FIG. 3). As described earlier, a material handling environment can include a plurality of vision systems. Illustratively, in some example embodiments, a distribution center DC can include a plurality of vision systems (401, 403, 407 etc.). Each of these vision systems (401-407) can include one or more LiDAR based sensors that may be installed and/or mounted at various sections of the material handling environment. In this aspect, each of these vision systems 401-407 can be capable of capturing a data stream (i.e. a 3D scan) of a target area.

According to some example embodiments, the operation monitored by using LiDAR based vision systems can correspond to replenishing of one or more containers. The containers may be placed on a gravity flow rack 408 and can be replenished with goods from the one or more SKUs 410 that may be arriving at a replenishment area of the replenishment zone 402. According to some example embodiments, there may be different sizes of containers for replenishment in the DC. For instance, a first set of containers 404 may be of moderate size, whereas a second set of containers 406 may be smaller than the first set of containers 404, and a third set of containers 405 may be larger than containers of the first set of containers 404. The replenishment of containers can be based on a size of the containers. According to some example embodiments, each of the containers 404, 406, 405 can have an associated container identifier (not shown). The container identifier may refer to a unique identifier that may be used to identify a particular container, such as, but not limited to, a serial number, a barcode label, RFID tag, etc. The container identifier may include information regarding the container, such as, but not limited to, type, size, capacity, weight, shape, and the like.

In accordance with said example embodiments, a container identifier for a container may be scanned before performing each replenishment operation for that container. By scanning the container identifier, a central controller (e.g. the controller 128) and/or any other computing device in the DC, may track an occupied volume of the container. Further, based on this information, the central controller may calculate a current capacity i.e. based on a maximum capacity of the container and the occupied volume. Said that, in accordance with said example embodiments, to maximize storage capacity and overall efficiency, it may be desired to pick appropriately sized container(s) from various sized containers for storing goods from the SKUs 410. In this aspect, by monitoring the data stream by the LiDAR based vision system that captures an execution of the replenishment operation over a period of time, an efficiency of the execution of such replenishment operation can be determined. In this regard, as described earlier, a machine learning model can determine the efficiency of the execution of operation. Further, the efficiency of the execution of the replenishment operation can be in accordance with existing SOPs and/or some pre-defined heuristics associated with a container replenishment operation of the material handling environment.

In some example embodiments, the data stream can be analyzed to identify a choke point associated with the operation in the DC. As an example, the controller 128 may identify a choke point indicative of a fault condition that may be associated with the one or more sections of the replenishment area 302. Further, the controller 128 may generate a message (e.g. on one or more display devices 412) indicating at least one of: the choke point and a remedial action to be performed to resolve the choke point. In some examples, the data stream captured by the vision systems (401-407) can be utilized to identify a safety issue related to the replenishment zone 402. For example, the safety issue may be related to stacking of multiple containers (404, 405, 406) by a palletizer in a manner which is prone to falling of one or more containers of the plurality of containers, in the DC. In some example embodiments, the safety issue may be associated to a movement of robotic arm of a robotic manipulator (e.g. that may be used for handling containers 404, 405, 406) at an abnormal speed.

In some example embodiments, the data stream captured by the vision systems (401, 403, 407) can be used to identify a new KPI that may be associated with a preferred route followed by the operator 414 to pick a container. In an example, the preferred route can be a route that may be safer for the operator to avoid any collision with objects (e.g. pallets, robotic manipulators etc.) that may be present in the material handling environment. In another example, the preferred route can be a route that may be shortest route to follow.

In accordance with said example embodiment, based on the scanning of various container identifiers, the controller 128 may generate an ordered sequence of container identifiers and/or serial numbers, associated with various containers that are to be handled for an SKU. In some example embodiments, the ordered sequence of container identifiers may be transmitted to the replenishment area and may be displayed on the display device 412. In this aspect, an operator 414 may follow the ordered sequence displayed on the display device 412, and may pick the identified containers (404, 406, and/or 405) from the gravity flow rack 408 for replenishing with goods from the SKU 410. In an embodiment, the identified containers (404, 405, and/or 406) may be presented to the operator 414 in the ordered sequence, for example, on a goods-to-operator workstation. In another embodiment, the gravity flow rack 408 may include a pick-to-light system such that pick-to-light system displays an ordered sequence of indicators (such as light) at the locations of the identified containers (404, 405, an/or 406) corresponding to the ordered sequence of container identifiers. In this regard, the data stream captured by the LiDAR sensor based vision systems may also capture a sequence of actuation of pick-to-lights of the pick-to-light system and/or subsequent operations performed by the operator 414. In this aspect, the data stream can be utilized to determine if the operator 414 is picking the items as per defined SOPs/KPIs associated with the pick-to-light system. As an example, some pick-to-light systems may involve pushing an actuator (e.g. button) to confirm picking of items from a location. In this aspect, the data stream captured by the LiDAR based vision system can be used by the controller 128 to determine if the operator 414 has performed this activity correctly. Further, in case of any observed deviation or inconsistency, the operator 414 may be notified for a corrective/remedial action on the display device 412.

According to some example embodiments, the operator 414 or a robotic tool may verify container identifiers associated with each picked container (404, 405, and/or 406, for example) by scanning the container identifier (such as a barcode label) that may be placed on the container. Further, the data stream captured by various LiDAR based sensors within the DC can be used to verify that the operator 414 or the robotic tool has picked the right containers. According to some example embodiments, information extracted by processing the data stream can be matched and/or compared with existing container identifier information and/or SOPs associated with that operation that is stored in a database associated with the central controller.

Figure 5:
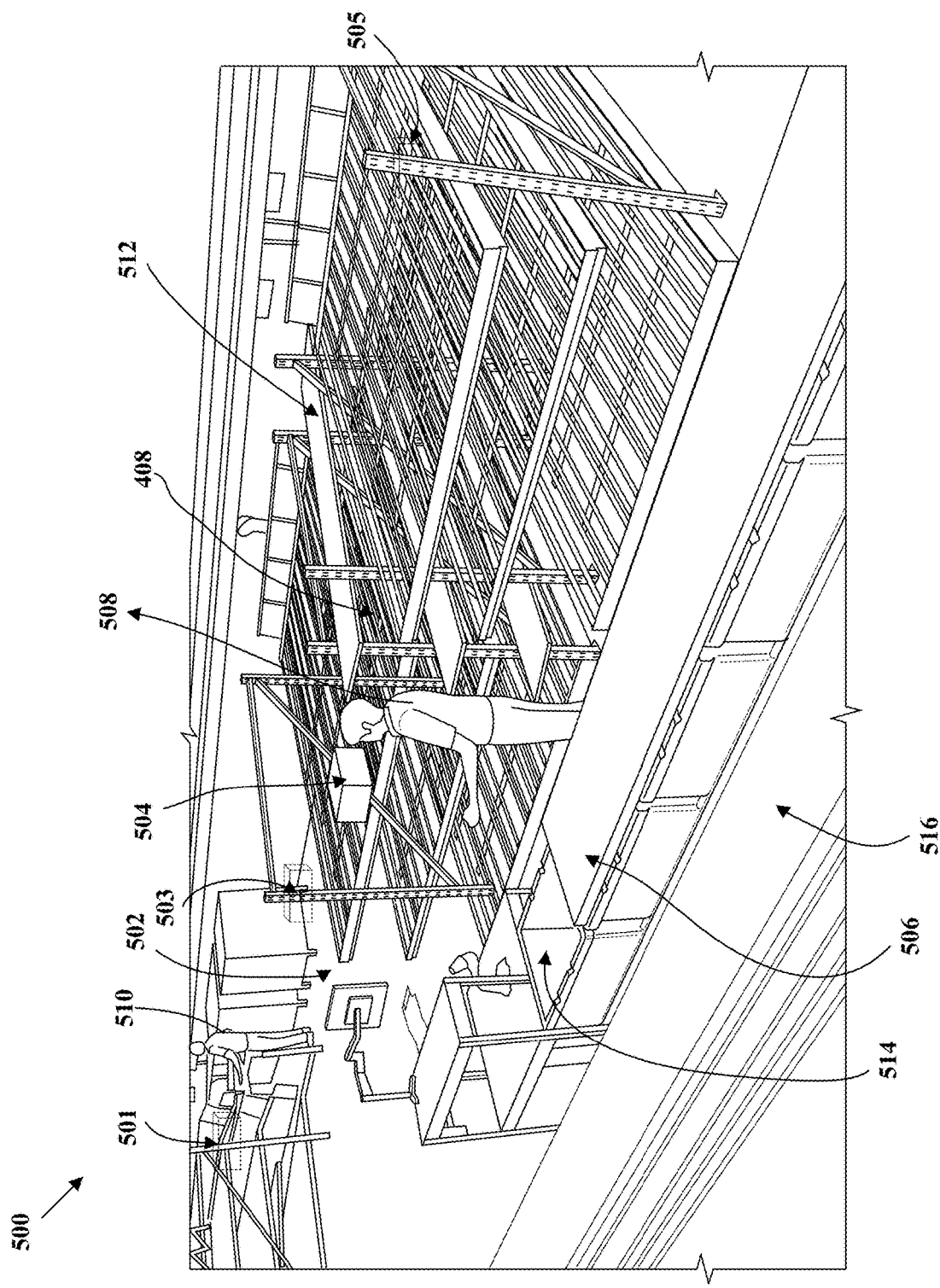
FIG. 5 illustrates another example scenario depicting another operation performed in a material handling environment that can be monitored by using LiDAR based vision system, according to an example embodiment.

FIG. 5 illustrates another example scenario 500 depicting another operation performed in a material handling environment that can be monitored by using LiDAR based vision system (e.g. the vision system 102, 202), according to an example embodiment. FIG. 5 illustrates a perspective view of a second replenishment zone 502 of the distribution center (DC), in accordance with one or more embodiments of the present disclosure. Illustratively, in some example embodiments, a distribution center DC can include a plurality of vision systems (501, 503, 505 etc.). Each of these vision systems (501-505) can include one or more LiDAR based sensors that may be installed and/or mounted at various sections of the material handling environment. In this aspect, each of these vision systems 501-505 can be capable of capturing a data stream (i.e. a 3D scan) of a target area. In accordance with some example embodiments, the data stream from the LiDAR sensor based vision system can capture an operation related to a replenishment process in the second replenishment zone 502.

According to some example embodiments, a replenishment process illustrated in FIG. 5 can include replenishing of one or more containers from a second set of containers 504 with goods from the replenished first set of containers 506 that may be arriving at the second replenishment zone 502 (e.g. through the gravity flow rack 408). In some example embodiments, the second set of containers 504 may correspond to shuttle totes used in an ASRS (e.g. the ASRS 122) that may be having multiple compartments of different size. The shuttle totes may be partially filled or empty and may be used to store goods in a storage facility, such as the ASRS 122 as illustrated in FIG. 1.

In accordance with some example embodiments, the data stream captured by the one or more vision systems (501-505) of the DC can be used to determine an efficiency of execution of the operations related to the shuttle totes associated with the ASRS. For instance, in some example embodiments, the data stream may be used by the controller to determine if a maximum optimization of storage capacity of the shuttle totes is being performed or not. In this regard, the data stream can be used to identify a filled and/or a un-filled capacity of the shuttle tote. Further, based on this determination, the controller may also generate new KPIs associated with optimal utilization of the shuttle totes. As an example, a new KPI may indicate that a shuttle tote may be sent to the ASRS only when the shuttle tote is completely filled so as to optimize the shuttle tote utilization and reduce time and resources spent in transferring half-filled shuttle totes to the storage location and retrieving the half-filled shuttle totes for further replenishment.

In another example embodiment, the data stream from the LiDAR sensor based vision systems can be used to identify a dimension, an alignment, and/or structure of the shuttle tote. In this regard, there may be different SOPs for transferring or moving shuttle totes within ASRS for different dimensions and/or structural characteristics associated with the shuttle totes. To this end, in response to identification of the dimension and/or the structural characteristics of the shuttle tote, the data stream can be further used to determine if a motion of the shuttle tote is as per a SOP defined for the movement of the shuttle totes for that situation. Furthermore, as described earlier, based on the data stream and a machine learning model, new KPIs may be identified for various situations (e.g. use cases which may be previously unknown).

Similar to as described earlier with respect to FIG. 4, a central controller (e.g. the controller 128) may generate another ordered sequence of container identifiers for replenishment of the second set of containers 504. In this respect, the data stream can also be used by the controller 128 to identify if the second set of containers 504 are being queued according to the ordered sequence of container identifiers. According to said example embodiments, one or more operators (508, 510) may replenish one or more containers from the second set of containers 504 available for replenishment. In some examples, the second set of containers 504 can be replenished with goods from the first set of containers 506 based on the ordered sequence of container identifiers. In accordance with said example embodiments, after replenishment, the operators (508, 510) may place empty containers 514 from the first set of containers 506 on a central gravity conveyor section 512. In this aspect, the central gravity conveyor section 512 may be inclined towards a first replenishment zone (as illustrated in FIG. 4), such that empty containers 514 may be transferred from the second replenishment zone 502 to the first replenishment zone to receive goods from a next SKU. Further, when a container from the second set of containers 504 is replenished with goods, the operator 508 may push the container onto a takeaway conveyor 516. The takeaway conveyor 516 may convey the container to a storage location and/or to downstream material handling systems for further processing and/or handling.

Thus, in accordance with various example embodiments described herein, all such steps of the replenishment operation as described earlier can be monitored using one or more data stream captured by various vision systems (501-507). Further, these data streams can be utilized by the central controller to identify, for example, a non-compliance according to an expected SOP defined for a specific process or any error condition that may have occurred in the material handling site. Some examples of such error conditions can be, for example, the shuttle tote is not empty, the shuttle tote size does not fit the goods to be replenished, etc.

In accordance with some example embodiments described herein, the data stream captured by various vision systems as described in reference to FIGS. 1-5 can be displayed on a display device. In some examples, the display device may be associated with an HMI within a material handling facility. In another example, the data stream may be displayed on a display device at a remote location (e.g. a DC monitoring station). According to some example embodiments, a dashboard including a plurality of key performance indicators associated with least one of the machine and the operator which are monitored based on the data stream can also be displayed on the display device.

As described earlier, various data streams captured by the LiDAR based vision systems can be utilized by the controller 128. In this aspect, by use of artificial intelligence and machine learning, a machine learning model can be constructed by using as input 3D point cloud data from the data stream, in addition to, various other factors such as, the operational specification data. Further, the machine learning model can be utilized to determine an operational efficiency associated with various operations, machines, and/or activities in a material handling site. Furthermore, by utilizing the machine learning model, a performance status regarding an efficiency of operations can be determined. Further, an audit report associated with the performance status with respect to various KPIs can be displayed on the display screen. In other words, the audit report can be used to visualize at least one of a production data, operations data, orchestration data associated with one or more activities in the material handling environment which are being identified using the data streams from the LiDAR based sensor systems.

Figure 6:
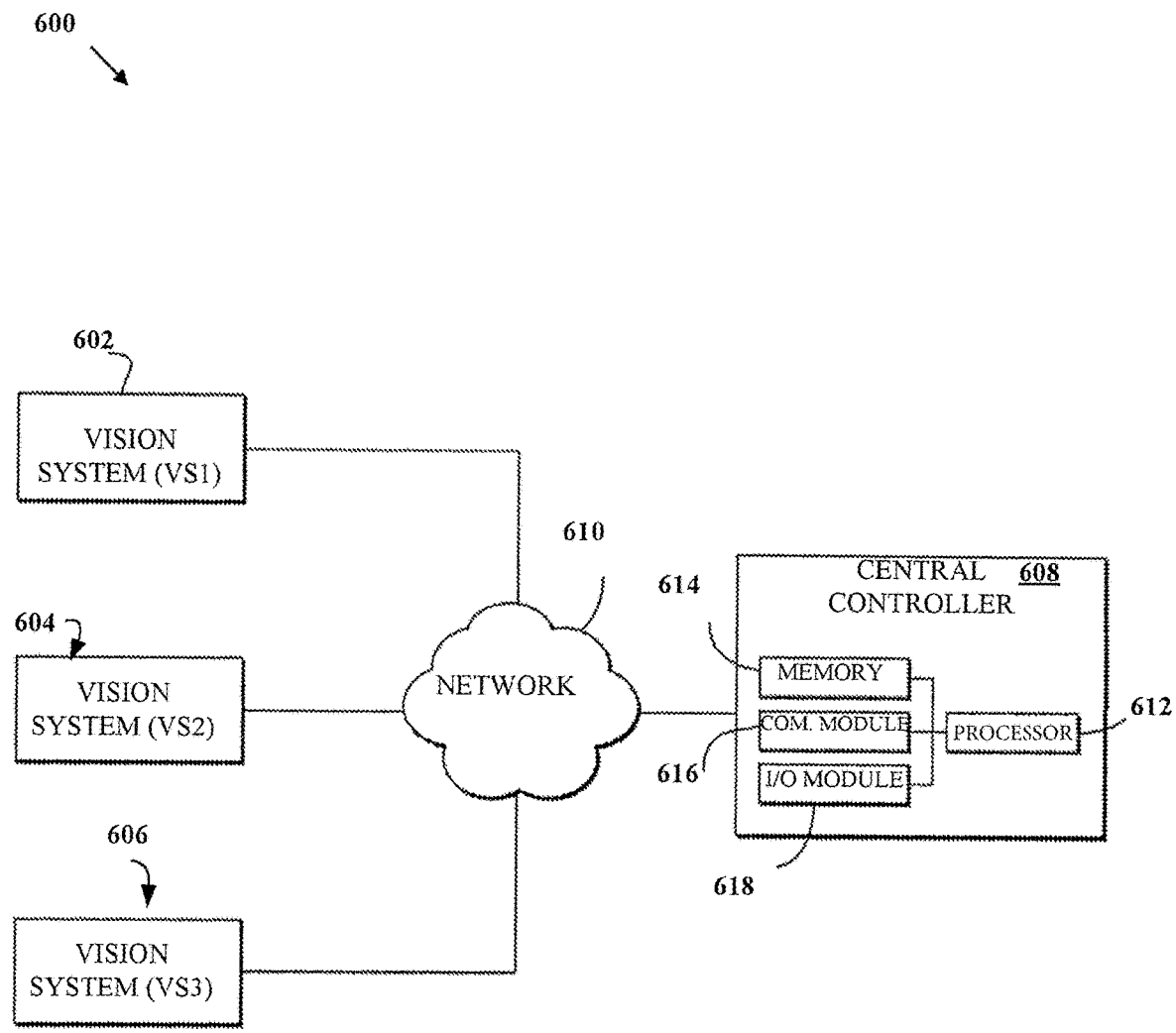
FIG. 6 illustrates a schematic block diagram illustrating one or more components a system for monitoring a material handling environment, in accordance with one or more embodiments of the present disclosure.

FIG. 6 illustrates a schematic block diagram illustrating one or more components a system 600 for monitoring a material handling environment, in accordance with one or more embodiments of the present disclosure. According to an example embodiment, the system 600 can include a plurality of vision systems e.g. 602, 604, 606 that may include LiDAR based sensors. As described in reference to FIGS. 1-5, there may be multiple vision systems 602, 604, 606 that can be installed at various locations within the material handling environment. Illustratively, each of the vision systems 602-606 can be communicably coupled to a central controller 608 through a network 610. Further, the LiDAR based sensors of these vision systems 602-606 can be capable of performing a 3D scan to capture various operations by machines, activities by workers, etc. at respective target areas of the material handling environment. Additionally, and/or alternatively, one or more of the vision systems 602-606 including the LiDAR based sensors may be used for any suitable purpose in addition to communicating with the central controller 608 for providing one or more data streams related to various target locations of the material handling environment.

According to some example embodiments, the network 610 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 610 may include a cellular telephone, an 802.11, 802.16, 802.20, and/or WiMax network. In some embodiments, Bluetooth may be used to communicate between devices. Further, the network 610 may include a public network, such as the Internet, a private network, such as an intranet, or combinations thereof, and may utilize a variety of networking protocols now available or later developed including, but not limited to TCP/IP based networking protocols.

As illustrated, the central controller 608 may include at least one processor 612, memory 614, communications module 616, and input/output module 618. According to some example embodiments, the processor 612 may be configured with processor executable instructions to perform operations described herein. In some example embodiments, the processor 612 for example can be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 6 as a single processor, in some embodiments processor 612 can comprise a plurality of processors. The plurality of processors may be embodied on a single device or may be distributed across a plurality of devices. The plurality of processors may be in operative communication with each other and may be collectively configured to perform one or more functionalities of the central controller 608 as described herein. In an example embodiment, processor 612 is configured to execute instructions stored in memory 614 or otherwise accessible to processor 612. These instructions, when executed by processor 612, may cause central controller 608 to perform one or more of the functionalities of central controller 608, as described herein.

In accordance with some example embodiments, the memory 614 may comprise, for example, volatile memory, non-volatile memory, or some combination thereof. Although illustrated in FIG. 6 as a single memory, the memory 614 may comprise a plurality of memory components. The plurality of memory components may be embodied on a single device or distributed across a plurality of devices. In various example embodiments, the memory 614 may comprise, for example, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. According to some example embodiments, the memory 614 may be configured to store information, data (including item data and/or profile data), applications, instructions, or the like for enabling central controller 608 to carry out various functions in accordance with example embodiments described herein. For example, in at least some embodiments, the memory 614 can be configured to buffer input data for processing by processor 612. Additionally, or alternatively, in at least some embodiments, memory 614 can be configured to store program instructions for execution by processor 612. In some example embodiments, the memory 614 can store information in the form of static and/or dynamic information. This stored information may be stored and/or used by the central controller 608 during the course of performing its functionalities.

According to some example embodiments, the communications module 616 may be embodied as any device or means embodied in circuitry, hardware, a computer program product comprising computer readable program instructions stored on a computer readable medium (e.g., the memory 614) and executed by a processing device (e.g., processor 612), or a combination thereof that is configured to receive and/or transmit data from/to another device and/or network, such as, for example, the vision systems (602-606). In some example embodiments, the communications module 616

(similar to other components discussed herein) can be at least partially embodied as or otherwise controlled by the processor 612. In some examples, the communications module 616 may be communicatively coupled with processor 612, such as via a bus. According to some example embodiments, the communications module 616 may include, for example, an antenna, a transmitter, a receiver, a transceiver, network interface card and/or supporting hardware and/or firmware/software for enabling communications with another device. In some example embodiments, the communications module 616 may be configured to receive and/or transmit any data that may be stored by the memory 614 using any protocol for communications between devices. Further, the communications module 616 may additionally or alternatively be communicatively coupled to the memory 614, the input/output module 618 and/or any other component of the central controller 608, such as via a bus.

According to some example embodiments, the input/output module 618 may be communicatively coupled to the processor 612. The input/output module 618 may be capable of receiving an indication of a user input and/or providing an audible, visual, mechanical, or other output to a user. According to some example embodiments, the input/output module 618 may include support, for example, for a human machine interface (HMI), a keyboard, a mouse, a joystick, a display, a touch screen display, a microphone, a speaker, a RFID reader, barcode reader, biometric scanner, and/or other input/output mechanisms. In some example embodiments, the central controller 608 can be embodied as a server or database. In this regard, aspects of the input/output module 618 may be reduced as compared to embodiments where the central controller 608 can be implemented as an end-user machine (e.g., remote worker device and/or employee device) or other type of device designed for complex user interactions. In some example embodiments (like other components discussed herein), the input/output module 618 may even be eliminated from the central controller 608. Alternatively, such as in embodiments wherein the central controller 608 is embodied as a server or database, at least some aspects of the input/output module 618 may be embodied on an apparatus used by a user that is in communication with the central controller 608. According to some example embodiments, the input/output module 618 may be in communication with the memory 614, the communications module 616, and/or any other component(s), such as via a bus. According to some example embodiments, one or more than one input/output module and/or other components can be included in the central controller 608.

As described above and as will be appreciated based on this disclosure, embodiments of the present invention may be configured as methods, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 612, as discussed above with reference to FIG. 6, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 614) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Figure 7:
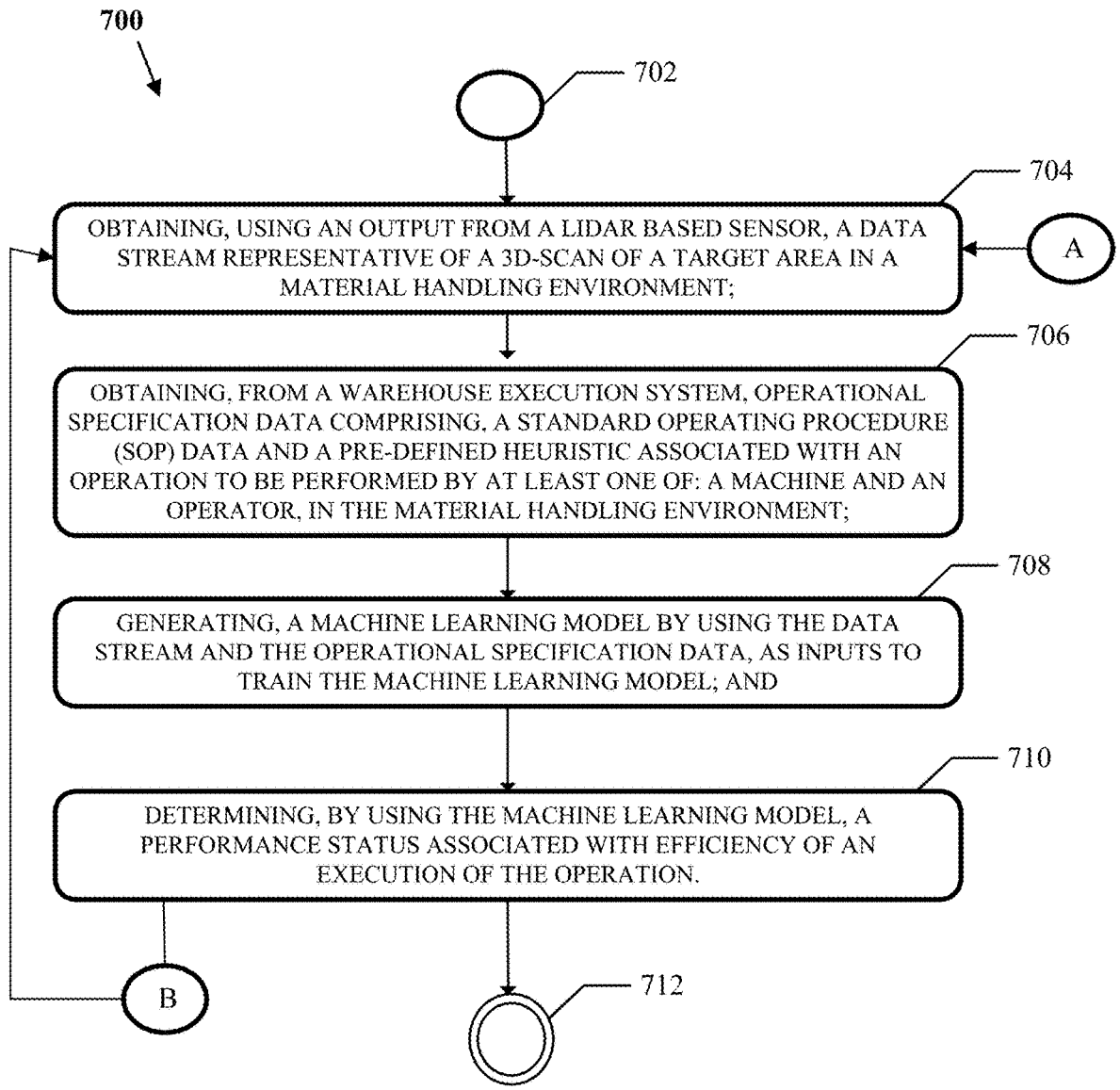
FIG. 7 illustrates a flow diagram representing a method for monitoring an operation in a material handling environment, in accordance with an example embodiment.

FIG. 7 illustrates a flow diagram representing a method 700 for monitoring an operation in a material handling environment, in accordance with an example embodiment. The method 700 can start at step 702. According to some example embodiments, at step 704, a system (e.g. the material handling system 100 or system 600) may include means such as, a controller (e.g. the controller 128, 608) including a processor (e.g. the processor 612) that can obtain a data stream representative of a 3D-scan of a target area of the material handling environment. In this aspect, the controller (128, 608) can obtain the data stream from a vision system (e.g. the vision system 102, 602-606). The data stream can correspond to a video stream and/or a data file that can be outputted by one or more LiDAR based sensors of the vision system, as described earlier in reference to FIGS. 1-5.

At step 706, the central controller (128, 608) can obtain operational specification data that can include data related to standard operating procedures (SOP) and pre-defined heuristics that can be associated with one or more operations to be performed in the material handling environment. The operations referred herein can be such operations that can be performed by a machine and/or an operator within the material handling environment. According to some example embodiments, the data related to SOP and the pre-defined heuristics can be obtained from a warehouse execution system and/or a warehouse management system that may be associated with the material handling environment.

At step 708, the central controller (128, 608) can generate, a machine learning model by using the data stream and the operational specification data. In this aspect, the data stream and the operational specification data can be provided as inputs to train the machine learning model by the central controller (128, 608). Further, at step 710, the central controller (128, 608) can determine a performance status associated with execution of the operation. The performance status can be determined using the machine learning model. The performance status can be associated with an efficiency of the execution of the operation. The method 700 stops at step 712.

Figure 8:
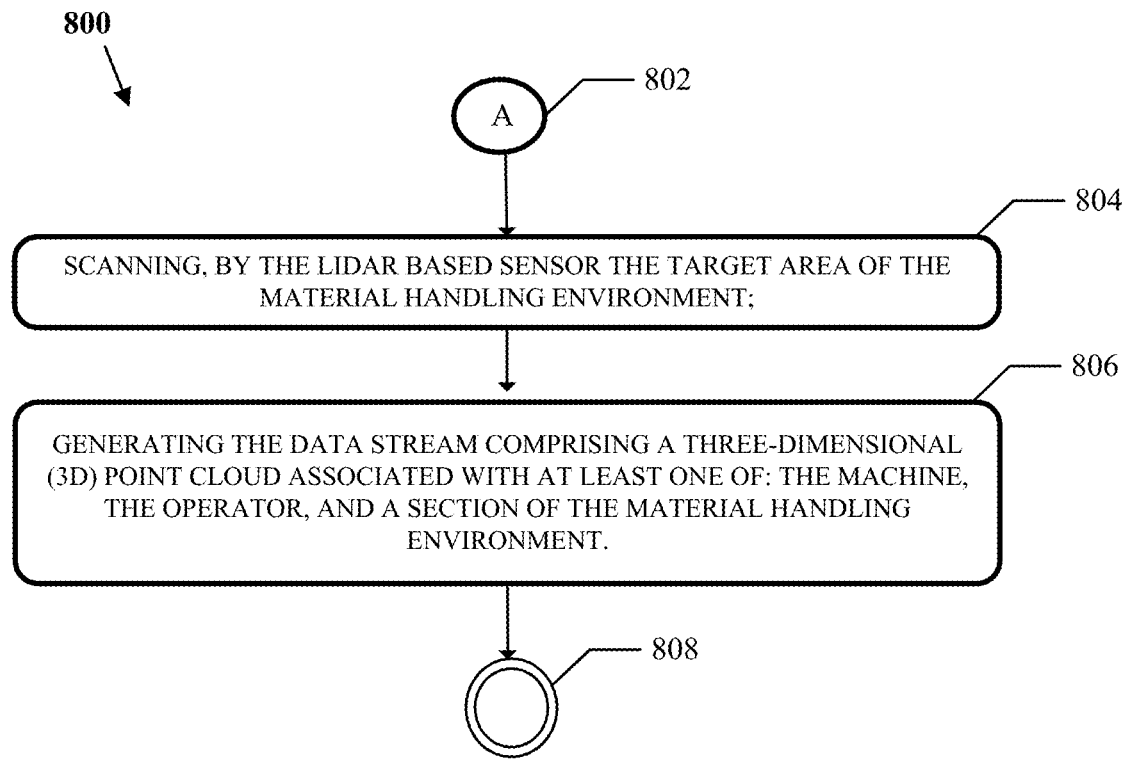
FIG. 8 illustrates a flow diagram representing a method for visualizing a target area of a material handling environment by using one or more LiDAR based sensors, in accordance with an example embodiment.

FIG. 8 illustrates a flow diagram representing a method 800 for visualizing a target area of a material handling environment using one or more LiDAR based sensors, in accordance with an example embodiment. The method 800 starts at step 802. In accordance with some example embodiments, the method 800 can start in response to receiving a request to obtain the data stream from a LiDAR based sensor (e.g. the LiDAR sensors 104) as described at step 704 of FIG. 7. In this regard, at step 804, a vision system (e.g. the vision system 102, 202, 602-606) of a material handling environment may include means such as, one or more LiDAR based sensors to perform scanning of a target area of the material handling environment. As described earlier in reference to FIGS. 1-7, there may be multiple LiDAR based sensors that can be installed at various location of the material handling environment.

Moving to step 806, the vision system (102, 202, 602-606) can generate a data stream based on the scanning of the target area performed by the LiDAR sensors at step 804. In this regard, the data stream can include point cloud data including three-dimensional co-ordinates of various physical points related to objects and/or individuals in the target area. In some examples, the point cloud data referred herein may represent a 3D view of an entire area and/or section of the material handling environment which may be captured in a field of view/observation area associated with a vision system. In other words, the point cloud data may capture a 3D representation of various objects, workers, etc. that may be present at the target area scanned by the LiDAR based vision systems. The method stops at step 808.

In some example embodiments, the point cloud data from the data stream can be used to determine a deviation in execution of the operation from defined SOPs and/or heuristics. In this aspect, in some example embodiments, a first set of data points derived from the data stream comprising the 3D point cloud can be compared with a second set of data points derived from the operational specification data or existing heuristics data to determine the deviation.

Figure 9:
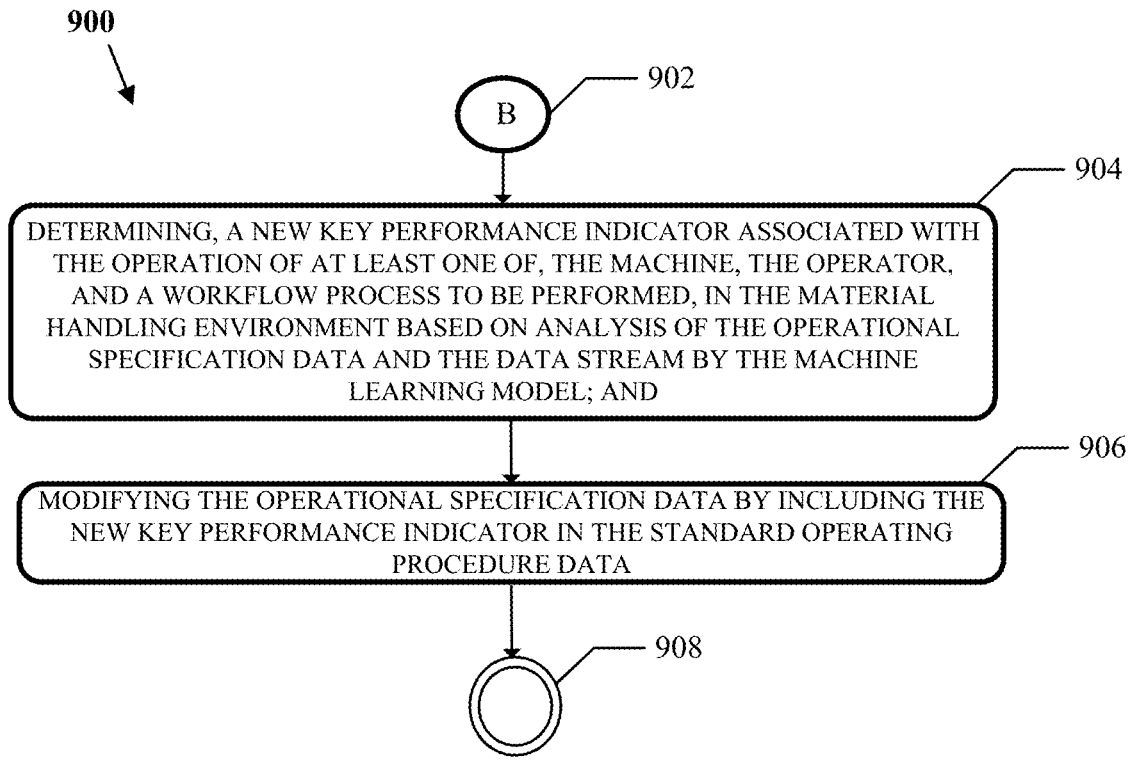
FIG. 9 illustrates a flow diagram representing a method for monitoring operational performance of a material handling environment using data stream from one or more LiDAR based sensors, in accordance with an example embodiment.

FIG. 9 illustrates a flow diagram representing a method 900 for monitoring operational performance of a material handling environment using data stream from one or more LiDAR based sensors of the material handling environment, in accordance with an example embodiment. The method 900 starts at step 902. In some example embodiments, the method 900 can start in response to generation of the machine learning model as described at step 708 of FIG. 7. In this regard, one or more steps of the method 900 described herein can be performed for determining a performance status associated with an execution of an operation and/or activity associated with one or more of machines, individuals, etc. within the material handling environment.

At step 904, a system (e.g. the material handling system 100) may include means such as, the controller 128 to determine a new key performance indicator (KPI). According to said example embodiments, the key performance indicator may be determined based on an analysis of an operational specification data and a data stream representing a 3D scan of a target area of the material handling environment. As described earlier in reference to FIGS. 7, the operational data may be obtained by the controller 128 from a warehouse execution system. The operational data can include SOP data and pre-defined heuristics associated with various operations (e.g., but not limited to, container replenishment operations, or item picking operations as described earlier) performed be one or more of machines and/or workers in the material handling environment. Further, the data stream as described earlier can correspond to recording of three-dimensional representation of the target area captured by one or more LiDAR sensors of the material handling system 100.

In some examples, the KPI can be associated with an operation of at least one of, the machine, the operator, and a workflow process to be performed in the material handling environment. In one example, the KPI can be associated with a structural characteristic of one or more objects that may be identified from the data stream. For instance, the KPI can be associated with structural characteristics associated with objects including at least one of: a tote, a container, a pallet, a carton, in the target area of the material handling environment. In this regard, based on the structural characteristics such as, size, texture, color, shape, orientation etc. associated with these objects, KPIs related to handling of these objects by individuals and/or machines can be defined and performance of various operations associated with these objects can be evaluated.

In another example, the KPI can be associated with a route followed by the operator to pick a first item while executing an item picking workflow. In another example, the KPI can be associated with an alignment of a tote that is conveyed through a portion of a conveyor. In another example, the KPI can be associated with an orientation of a third item while transiting through a portion of the conveyor. In another example, the KPI can be related with dimension of a container entering in a zone of an automated storage and retrieval system (e.g. the ASRS 122, as described in FIG. 1).

Moving to step 906, the controller 128 may modify the operational specification data by including the new KPI generated at step 904 in the SOP data. In some example embodiments, this modification to the operational specification data may be a part of a remedial or course corrective action identified based on determining the performance status as described at step 710 of the method 700. The method stops at step 908.

According to some example embodiments, the machine learning model to determine the performance status can be constructed by a machine learning engine that may be deployed by a processing device (e.g. the controller 128). In some examples, the machine learning engine can include its own processing unit. Alternatively, in some example embodiments, the machine learning engine can be communicatively coupled to an external processing unit such as, the processor 612 or the controller 128, as described earlier. In accordance with some example embodiments, the machine learning engine can employ one or more machine learning processes and/or one or more artificial intelligence techniques to generate the machine learning model. In some example embodiments, the machine learning model constructed by the machine learning engine can be trained by using the data stream captured by one or more LiDAR based sensors associated with various vision systems in the material handling environment. Additionally, in some example embodiments, the operational specification data including various SOPs and pre-defined heuristics associated with various processes and/or machines in the material handling system can also be used as an input to train the machine learning model. In this regard, in some example embodiments, a correlation amongst various scenarios identifiable from the data stream and the operational data can be determined and used as an input to train the machine learning model. In some example embodiments, the machine learning model can be based on neural network. In other words, the machine learning engine can deploy a neural network to construct the machine learning model. In this aspect, according to some example embodiments, the input data including the data stream and the operational specification data can be processed through one or more layers of a neural network architecture to output a decision classification which can determine a performance status of execution of an operation associated with a machine and/or a worker in the material handling environment. In this aspect, in some examples, the performance status can be associated with an efficiency of execution of the operation.

According to various example embodiments, to generate and train the machine learning model, the machine learning engine can employ various techniques. For instance, in some examples, support vector machine (SVM) classifier can be used by the machine learning engine to determine one or more classifications, one or more correlations, one or more expressions, one or more inferences, one or more patterns, one or more features and/or other learned information from the input data (i.e. the data stream from the one or more LiDAR based sensors and/or the operational specification data). In another example embodiment, the machine learning engine can employ one or more machine learning classification techniques such as, but not limited to, techniques associated with a Bayesian machine learning network, a binary classification model, a multiclass classification model, a linear classifier model, a quadratic classifier model, a neural network model, a probabilistic classification model, decision trees and/or one or more other classification models. According to some example embodiments, the machine learning model (e.g., the classification model, the machine learning classifier, etc.) employed by the machine learning engine can be explicitly trained (e.g., via training data) and/or implicitly trained (e.g., via extrinsic data received by the machine learning model). For example, the machine learning model (e.g., the classification model, the machine learning classifier, etc.) employed by the machine learning engine can be trained with training data that can include, for example, but not limited to, the data stream representing 3D scan of a target area, operational specification data including SOPs defined for various use cases, pre-defined heuristics associated with various processes and/or operations performed in a material handling site. Further, the input data can be processed through one or more network layers of neural network by using one or more activation functions (e.g. ReLU function etc.) as applicable according to a desired output.

Figure 10:
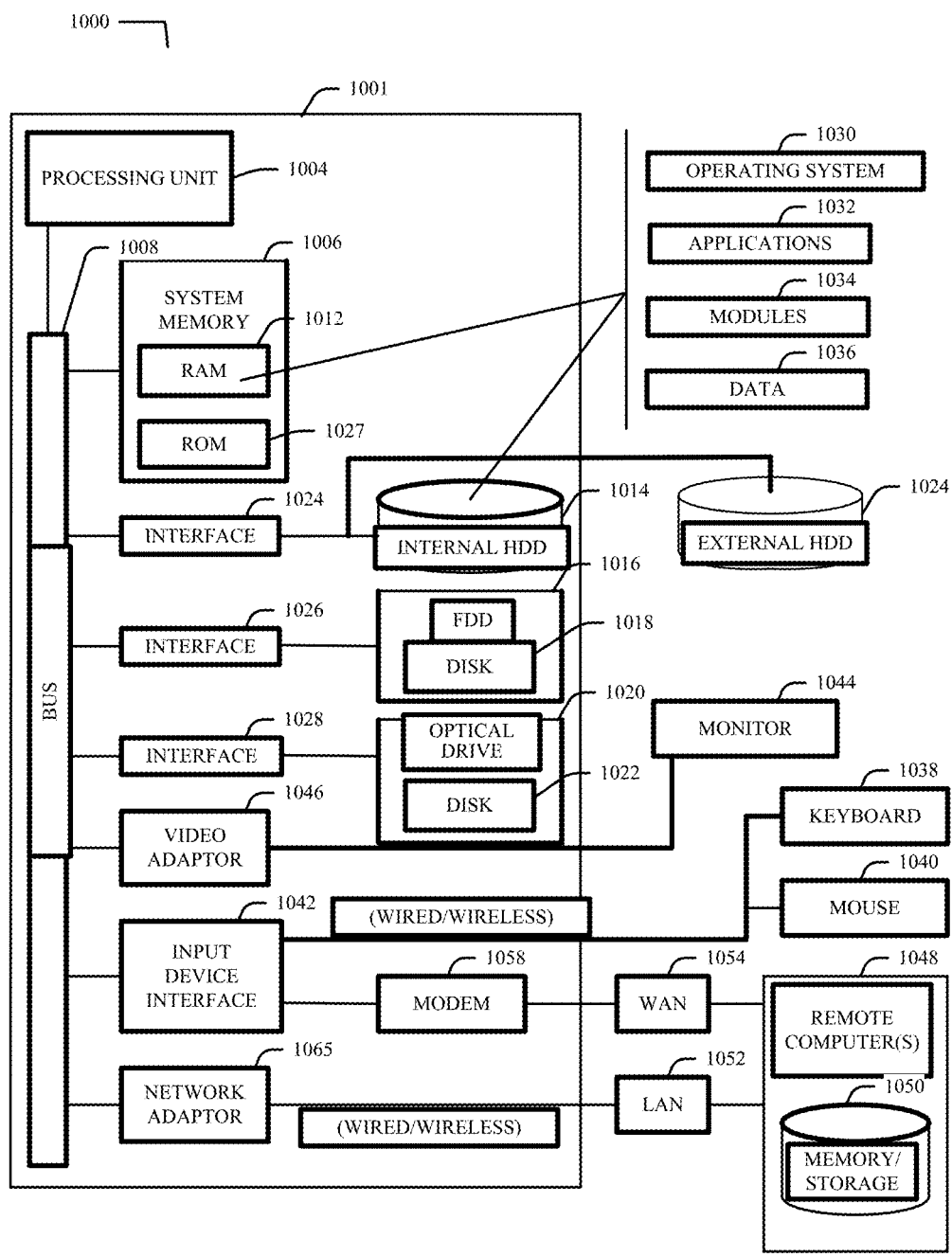
FIG. 10 illustrates a perspective view of an example of computing device of a material handling system, in accordance with an example embodiment.

FIG. 10 illustrates a perspective view of an example of computing device 1000 of a material handling system, in accordance with an example embodiment. In some example embodiments, the computing device 1000 can correspond to the DC execution system 126 including the controller 128, as described in FIG. 1 In some example embodiments, the computing device 1000 can correspond to the central controller 608 as described in reference to FIG. 6. In some example embodiments, one or more components of the computing device 1000 can be used to perform one or more operations described in reference to FIGS. 7-9.

In some example embodiments, the computing device 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

According to said example embodiments, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices. In accordance with some example embodiments, computing devices typically include a variety of media, which can include computer-readable storage media or communications media, which two terms are used herein differently from one another as follows.

According to some example embodiments, a computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

In some examples, communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the computing device 1000 can comprise a processing unit 1004, a system memory 1006 and a system bus 1008. The system bus 1008 can be configured to couple system components including, but not limited to, the system memory 1006 to the processing unit 1004. In some example embodiments, the processing unit 1004 can be any of various commercially available processors. To this end, in some examples, dual microprocessors and other multi-processor architectures can also be employed as the processing unit 1004.

According to some example embodiments, the system bus 1008 can be any of several types of bus structure that can further interconnect to a memory bus (with or without a memory controller), a peripheral bus, and a local bus using any of a variety of commercially available bus architectures. In some examples, the system memory 1006 can comprise, read-only memory (ROM) 1027 and random-access memory (RAM) 1012. According to some example embodiments, a basic input/output system (BIOS) is stored in a non-volatile memory 1027 such as ROM, EPROM, EEPROM, which BIOS contains the basic routines that help to transfer information between elements within the computing device 1000, such as during start-up. The RAM 1012 can also comprise a high-speed RAM such as static RAM for caching data.

According to some example embodiments, the computing device 1000 can further comprise an internal hard disk drive (HDD) 1014 (e.g., EIDE, SATA), which internal hard disk drive 1014 can also be configured for external use in a suitable chassis (not shown), a magnetic floppy disk drive (FDD) 1018, (e.g., to read from or write to a removable diskette 1016) and an optical disk drive 1020, (e.g., reading a CD-ROM disk or, to read from or write to other high capacity optical media such as the DVD). In some examples, the hard disk drive 1014, magnetic disk drive 1022, and optical disk drive 1020 can be connected to the system bus 1008 by a hard disk drive interface 1024, a magnetic disk drive interface 1026 and an optical drive interface 1028, respectively. According to some example embodiments, the interface 1024 for external drive implementations can comprise, at least one or both of Universal Serial Bus (USB) and IEEE 1394 interface technologies. Other external drive connection technologies are within contemplation of the subject embodiments.

According to some example embodiments described herein, the drives and their associated computer-readable media provide nonvolatile storage of data, data structures, computer-executable instructions, and so forth. For the computing device 1000 the drives and media accommodate the storage of any data in a suitable digital format. Although the description of computer-readable media above refers to a HDD, a removable magnetic diskette, and a removable optical media such as a CD or DVD, it can be appreciated by those skilled in the art that other types of media which are readable by an computing device 1000, such as zip drives, magnetic cassettes, flash memory cards, cartridges, and the like, can also be used in the example operating environment, and further, that any such media can contain computer-executable instructions for performing the methods of the disclosed embodiments.

In some example embodiments, a number of program modules can be stored in the drives and RAM 1012, including an operating system 1030, one or more application programs 1032, other program modules 1034 and program data 1036. To this end, in some examples, all or portions of the operating system, applications, modules, and/or data can also be cached in the RAM 1012. It is to be appreciated that the various embodiments can be implemented with various commercially available operating systems or combinations of operating systems.

According to some example embodiments, a user can enter commands and information into the computing device 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. In some examples, these and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

According to some example embodiments, a monitor 1044 or other type of display device can also be connected to the system bus 1008 through an interface, such as a video adapter 1046. In addition to the monitor 1044, the computing device 1000 can also comprise other peripheral output devices (not shown), such as speakers, printers, etc.

According to some example embodiments, the computing device 1000 can operate in a networked environment using logical connections by wired and/or wireless communications to one or more remote computers, such as a remote computer(s) 1048. In some examples, the remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. According to some example embodiments, the logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

In some examples, when used in a LAN networking environment, the computing device 1001 can be connected to the LAN 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

In alternate examples, when used in a WAN networking environment, the computing device 1001 can include a modem 1058, or can be connected to a communications server on the WAN 1054 or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

According to some example embodiments, the computing device 1000 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can further comprise at least Wi-Fi and Bluetooth™ wireless technologies. Thus, the communication can be a predefined structure as with a conventional network or simply an ad hoc communication between at least two devices.

In accordance with some example embodiments, Wi-Fi, or Wireless Fidelity, allows connection to the Internet from a couch at home, a bed in a hotel room, or a conference room at work, without wires. To this end, Wi-Fi referred herein, is a wireless technology similar to that used in a cell phone that enables such devices, e.g., computers, to send and receive data indoors and out; anywhere within the range of a base station. Wi-Fi networks use radio technologies called IEEE1002.10 (a, b, g, n, etc.) to provide secure, reliable, fast wireless connectivity. Further, in accordance with some example embodiments described herein, a Wi-Fi network can be used to connect computers to each other, to the Internet, and to wired networks (which use IEEE1002.3 or Ethernet). Wi-Fi networks operate in the unlicensed 2.4 and 5 GHZ radio bands, at an 10 Mbps (1002.10b) or 54 Mbps (1002.10a) data rate, for example, or with products that contain both bands (dual band), so the networks can provide real-world performance similar to the basic "9BaseT" wired Ethernet networks used in many offices.

In some example embodiments, certain ones of the operations herein can be modified or further amplified as described below. Moreover, in some embodiments additional optional operations can also be included. It should be appreciated that each of the modifications, optional additions or amplifications described herein can be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, some steps or methods can be performed by circuitry that is specific to a given function.

In one or more exemplary aspects, the functions described can be implemented in hardware, software, firmware, or any combination thereof. If implemented in software, the functions can be stored as one or more instructions or code on a non-transitory computer-readable medium or non-transitory processor-readable medium. The steps of a method or algorithm disclosed herein can be embodied in a processor-executable software module (or processor-executable instructions) which can reside on a non-transitory computer-readable or processor-readable storage medium. Non-transitory computer-readable or processor-readable storage media can be any storage media that can be accessed by a computer or a processor. By way of example but not limitation, such non-transitory computer-readable or processor-readable media can include RAM, ROM, EEPROM, FLASH memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm can reside as one or any combination or set of codes and/or instructions on a non-transitory processor-readable medium and/or computer-readable medium, which can be incorporated into a computer program product.

While various embodiments in accordance with the principles disclosed herein have been shown and described above, modifications thereof can be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above can relate to specific embodiments but shall not limit the application of such issued claims to processes and structures accomplishing any or all of the above advantages or having any or all of the above features.

In addition, the section headings used herein are provided for consistency with the suggestions under 37 C.F.R. 1.77 or to otherwise provide organizational cues. These headings shall not limit or characterize the invention(s) set out in any claims that can issue from this disclosure. For instance, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions can be set forth according to the limitations of the multiple claims issuing from this disclosure, and such claims accordingly define the invention(s), and their equivalents, that are protected thereby. In all instances, the scope of the claims shall be considered on their own merits in light of this disclosure but should not be constrained by the headings set forth herein.

Also, techniques, systems, subsystems, and methods described and illustrated in the various embodiments as discrete or separate can be combined or integrated with other systems, modules, techniques, or methods without departing from the scope of the present disclosure. Other items shown or discussed as directly coupled or communicating with each other can be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. For example, the various elements or components can be combined or integrated in another system or certain features can be omitted or not implemented. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

As will be appreciated, any such computer program instructions and/or other type of code can be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of a local or networked system and/or circuitry. In some embodiments, one or more external systems (such as a remote cloud computing and/or data storage system) can also be leveraged to provide at least some of the functionality discussed herein.

As described above and as will be appreciated based on this disclosure, embodiments of the present invention can be configured as methods, personal computers, servers, mobile devices, backend network devices, and the like. Accordingly, embodiments can comprise various means including entirely of hardware or any combination of software and hardware. Furthermore, embodiments can take the form of a computer program product on at least one non-transitory computer-readable storage medium having computer-readable program instructions (e.g., computer software) embodied in the storage medium. Any suitable computer-readable storage medium can be utilized including non-transitory hard disks, CD-ROMs, flash memory, optical storage devices, or magnetic storage devices.

What is claimed is:

1. A method of monitoring an operation in a material handling environment, the method comprising:
generating a machine learning model by using a data stream representative of a three-dimensional (3D) scan of a target area and operational specification data associated with the operation to be performed in the material handling environment as inputs to train the machine learning model;
comparing, by using the machine learning model, a first set of data points derived from the data stream comprising a 3D point cloud of the material handling environment with a second set of data points derived from the operational specification data; and
determining, by using the machine learning model, a performance status associated with an efficiency of an execution of the operation.

2. The method of claim 1 further comprising:
scanning, by a LiDAR based sensor, the target area of the material handling environment; and
generating the data stream comprising the 3D point cloud associated with at least one of a machine, an operator, or a section of the material handling environment.

3. The method of claim 1 further comprising:
analyzing the data stream to identify a choke point associated with the operation in the material handling environment, wherein the choke point is indicative of a fault condition associated with an operator of at least one of a machine or a workflow performed by the operator in the material handling environment; and
generating a message indicating at least one of the choke point or a remedial action to be performed to resolve the choke point.

4. The method of claim 1 further comprising:
determining a new key performance indicator associated with the operation of at least one of a machine, an operator, or a workflow process to be performed in the material handling environment based on analysis of the operational specification data and the data stream by the machine learning model; and
modifying the operational specification data by including the new key performance indicator in standard operating procedure data.

5. The method of claim 1, wherein the operational specification data comprises standard operating procedure (SOP) data and pre-defined heuristic associated with the operation to be performed by at least one of a machine or an operator in the material handling environment.

6. The method of claim 1, wherein the data stream is configured to be used to perform at least one of:
monitoring movement of a plurality of containers in a replenishment zone in the material handling environment to one or more shuttle totes configured to store goods in an Automated Storage and Retrieval System (ASRS);
monitoring movement of pallets configured to stack a plurality of items associated with a plurality of characteristics;
monitoring movement of at least one of a robotic tool of a robotic manipulator or an operator in the material handling environment while executing an item picking operation;
identifying empty containers in the material handling environment;
monitoring movement of the empty containers in the material handling environment;
monitoring replenishment of the plurality of containers based on characteristics of the plurality of containers; or
monitoring movement of the plurality of containers placed on a gravity flow rack in the replenishment zone.

7. The method of claim 1 further comprising:
scanning a container identifier associated with at least one container of a plurality of containers;
determining an occupied volume of the at least one container based on the data stream;
determining a current capacity of the at least one container based on a maximum capacity of the at least one container and the occupied volume of the at least one container; and
controlling item picking operation based on the determined current capacity of the at least one container.

8. The method of claim 1, further comprising:
generating an ordered sequence of container identifiers associated with a plurality of containers configured to be handled in the material handling environment; and
transmitting the ordered sequence of the container identifiers to a display device of a human-machine interface provided in the material handling environment.

9. The method of claim 1, further comprising:
displaying an ordered sequence of indicators of pick-to-lights of a pick-to-light system at locations of a plurality of containers corresponding to an ordered sequence of container identifiers;
capturing a sequence of actuation of the indicators of the pick-to-lights of the pick-to-light system; and
monitoring the performance status associated with the efficiency of an execution of the operation using the pick-to-light system.

10. A non-transitory computer readable medium that stores thereon computer-executable instructions that, in response to being executed by a processor, perform operations comprising:
generating a machine learning model by using a data stream representative of a three-dimensional (3D) scan of a target area and operational specification data associated with an operation to be performed in a material handling environment as inputs to train the machine learning model;
comparing, by using the machine learning model, a first set of data points derived from the data stream comprising a 3D point cloud of the material handling environment with a second set of data points derived from the operational specification data; and
determining, by using the machine learning model, a performance status associated with an execution of the operation, wherein the performance status is associated with an efficiency of the execution of the operation.

11. The non-transitory computer readable medium of claim 10, wherein the operational specification data comprises standard operating procedure (SOP) data and pre-defined heuristic associated with the operation to be performed by at least one of a machine or an operator in the material handling environment.

12. The non-transitory computer readable medium of claim 10, wherein the computer-executable instructions, in response to being executed by the processor, perform operations further comprising:
generating a first feedback indicative of a degree of deviation from a predefined efficiency level; and
generating a second feedback indicative of an action to be performed so that an execution of the action causes the execution of the operation to meet the predefined efficiency level.

13. The non-transitory computer readable medium of claim 10, wherein the computer-executable instructions, in response to being executed by the processor, perform operations based on the data stream further comprising at least one of:
monitoring movement of a plurality of containers in a replenishment zone in the material handling environment to one or more shuttle totes configured to store goods in an Automated Storage and Retrieval System (ASRS);
monitoring movement of pallets configured to stack a plurality of items associated with a plurality of characteristics;
monitoring movement of at least one of a robotic tool of a robotic manipulator and an operator in the material handling environment while executing an item picking operation;
identifying empty containers in the material handling environment;
monitoring movement of the empty containers in the material handling environment;
monitoring replenishment of the plurality of containers based on characteristics of the plurality of containers; or
monitoring movement of the plurality of containers placed on a gravity flow rack in the replenishment zone.

14. The non-transitory computer readable medium of claim 10, wherein the computer-executable instructions, in response to being executed by the processor, perform operations further comprising:
determining a new key performance indicator associated with an operation of at least one of a machine, an operator, or a workflow process to be performed in the material handling environment based on analyzing of the operational specification data and the data stream by the machine learning model; and
modifying the operational specification data by including the new key performance indicator in standard operating procedure data.

15. The non-transitory computer readable medium of claim 10, wherein the computer-executable instructions, in response to being executed by the processor, perform operations further comprising:
   scanning a container identifier associated with at least one container of a plurality of containers;
   determining an occupied volume of the at least one container based on the data stream;
   determining a current capacity of the at least one container based on a maximum capacity of the at least one container and the occupied volume of the at least one container; and
   controlling item picking operation based on the determined current capacity of the at least one container.

16. A material handling system comprising:
   a computing system comprising a processor configured to:
      obtain a data stream comprising a three-dimensional (3D) point cloud representative of a 3D-scan of a target area from a vision system;
      obtain, from a warehouse execution system, operational specification data associated with an operation to be performed in a material handling environment;
      generate a machine learning model by using the data stream and the operational specification data as inputs to train the machine learning model;
      compare, by using the machine learning model, a first set of data points derived from the data stream comprising a 3D point cloud of the material handling environment with a second set of data points derived from the operational specification data; and
      determine, by using the machine learning model, a performance status associated with an efficiency of an execution of the operation.

17. The material handling system of claim 16, wherein the operational specification data comprises a standard operating procedure (SOP) data and a pre-defined heuristic associated with the operation to be performed by at least one of a machine or an operator in the material handling environment.

18. The material handling system of claim 16, wherein the processor is configured to:
   scan a container identifier associated with at least one container of a plurality of containers;
   determine an occupied volume of the at least one container based on the data stream;
   determine a current capacity of the at least one container based on a maximum capacity of the at least one container and the occupied volume of the at least one container; and
   control item picking operation based on the determined current capacity of the at least one container.

19. The material handling system of claim 16, wherein the processor is configured to:
   generate an ordered sequence of container identifiers associated with a plurality of containers configured to be handled in the material handling environment; and
   transmit the ordered sequence of the container identifiers to a display device of a human-machine interface coupled to the processor.

20. The material handling system of claim 16, further comprising:
   display an ordered sequence of indicators of pick-to-lights of a pick-to-light system at locations of a plurality of containers corresponding to an ordered sequence of container identifiers;
   capture a sequence of actuation of the indicators of the pick-to-lights of the pick-to-light system; and
   monitor the performance status associated with the efficiency of the execution of the operation using the pick-to-light system.

* * * * *